United States Patent [19]

Campbell et al.

[11] Patent Number: 5,021,947

[45] Date of Patent: Jun. 4, 1991

[54] DATA-FLOW MULTIPROCESSOR ARCHITECTURE WITH THREE DIMENSIONAL MULTISTAGE INTERCONNECTION NETWORK FOR EFFICIENT SIGNAL AND DATA PROCESSING

[75] Inventors: Michael J. Campbell; Dennis J. Finn; George K. Tucker, all of Los Angeles; Michael D. Vahey, Manhattan Beach; Rex W. Vedder, Playa del Rey, all of Calif.

[73] Assignee: Hughes Aircraft Company, Los Angeles, Calif.

[21] Appl. No.: 474,707

[22] Filed: Jan. 30, 1990

Related U.S. Application Data

[63] Continuation of Ser. No. 145,033, Jan. 19, 1988, abandoned, which is a continuation-in-part of Ser. No. 847,087, Mar. 31, 1986, abandoned.

[51] Int. Cl.$^5$ ............................................. G06F 15/82
[52] U.S. Cl. ................................. 364/200; 364/232.22; 364/280.1; 364/280.4; 364/281.6; 364/228.7; 364/281.8; 382/49
[58] Field of Search ... 364/200 MS File, 900 MS File, 364/736; 382/49

[56] References Cited

U.S. PATENT DOCUMENTS

| | | | |
|---|---|---|---|
| 3,614,745 | 10/1971 | Podvin et al. | 364/200 |
| 3,978,452 | 8/1976 | Barton et al. | 364/200 |
| 4,145,733 | 3/1979 | Misunas et al. | 364/200 |
| 4,153,933 | 5/1979 | Dennis et al. | 364/200 |
| 4,379,326 | 4/1983 | Anastas et al. | 364/200 |
| 4,418,383 | 11/1983 | Doyle et al. | 364/200 |
| 4,447,875 | 5/1984 | Bolton et al. | 364/200 |
| 4,466,061 | 8/1984 | DeSantis et al. | 364/200 |
| 4,583,164 | 4/1986 | Tolle | 364/200 |
| 4,644,461 | 2/1987 | Jennings | 364/200 |
| 4,727,487 | 2/1988 | Masui et al. | 364/200 |
| 4,922,413 | 5/1990 | Stoughton et al. | 364/200 |

OTHER PUBLICATIONS

A Distributed VLSI Architecture for Efficient Signal and Data Processing by J. Gaudio et al., IEEE Transactions on Computers, 12/85, pp. 1072-1086.
The Hughes Data Flow Multiprocessor: Architecture for Efficient Signal and Data Processing by R. Vedder et al., International Symposium on Computer Architecture, Conference Proceedings, Jun. 1985, pp. 324-332.
The Hughes Data Flow Multiprocessor by R. Vedder et al., Proceedings of the International Conference on Distributed Computing Systems, May 1985, pp. 2-9.
Static Allocation for a Data Flow Multiprocessor by M. L. Campbell, Proceedings of the International Conference on Parallel Processing, 8/85, pp. 511-517.

*Primary Examiner*—Thomas C. Lee
*Attorney, Agent, or Firm*—William J. Streeter; Wanda K. Denson-Low

[57] ABSTRACT

A data-flow architecture and software environment for high-performance signal and data procesing. The programming environment allows applications coding in a functional high-level language 20 which a compiler 30 converts to a data-flow graph form 40 which a global allocator 50 then automatically partitions and distributes to multiple processing elements 80, or in the case of smaller problems, coding in a data-flow graph assembly language so that an assembler 15 operates directly on an input data-flow graph file 13 and produces an output which is then sent to a local allocator 17 for partitioning and distribution. In the former case a data-flow processor description file 45 is read into the global allocator 50, and in the latter case a data-flow processor description file 14 is read into the assembler 15. The data-flow processor 70 consists of multiple processing elements 80 connected in a three-dimensional bussed packet routing network. Data enters and leaves the processor 70 via input/output devices 90 connected to the processor. The processing elements are designed for implementation in VLSI (Very large scale integration) to provide realtime processing with very large throughput. The modular nature of the computer allows adding more processing elements to meet a range of throughout and reliability requirements. Simulation results have demonstrated high-performance operation, with over 64 million operations per second being attainable using only 64 processing elements.

12 Claims, 16 Drawing Sheets

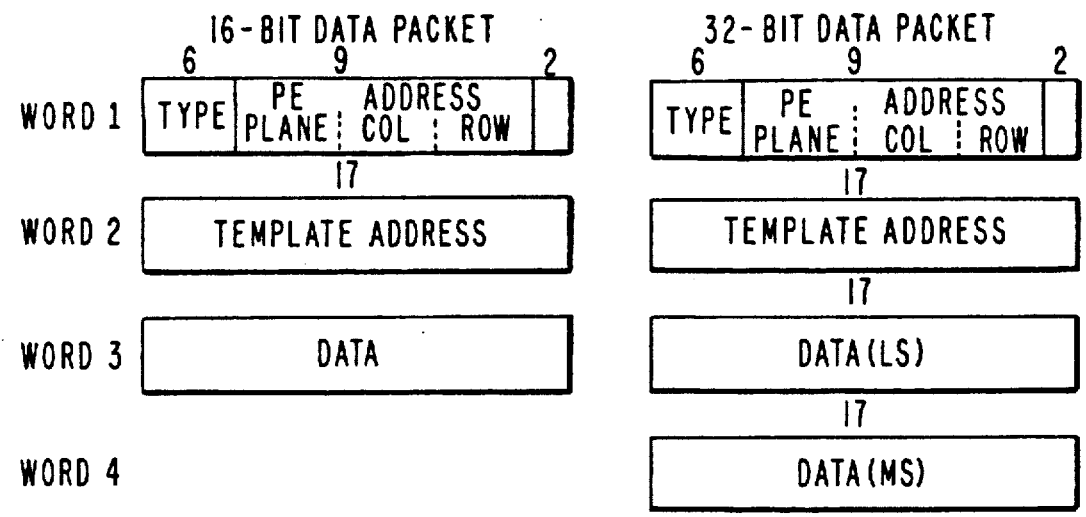
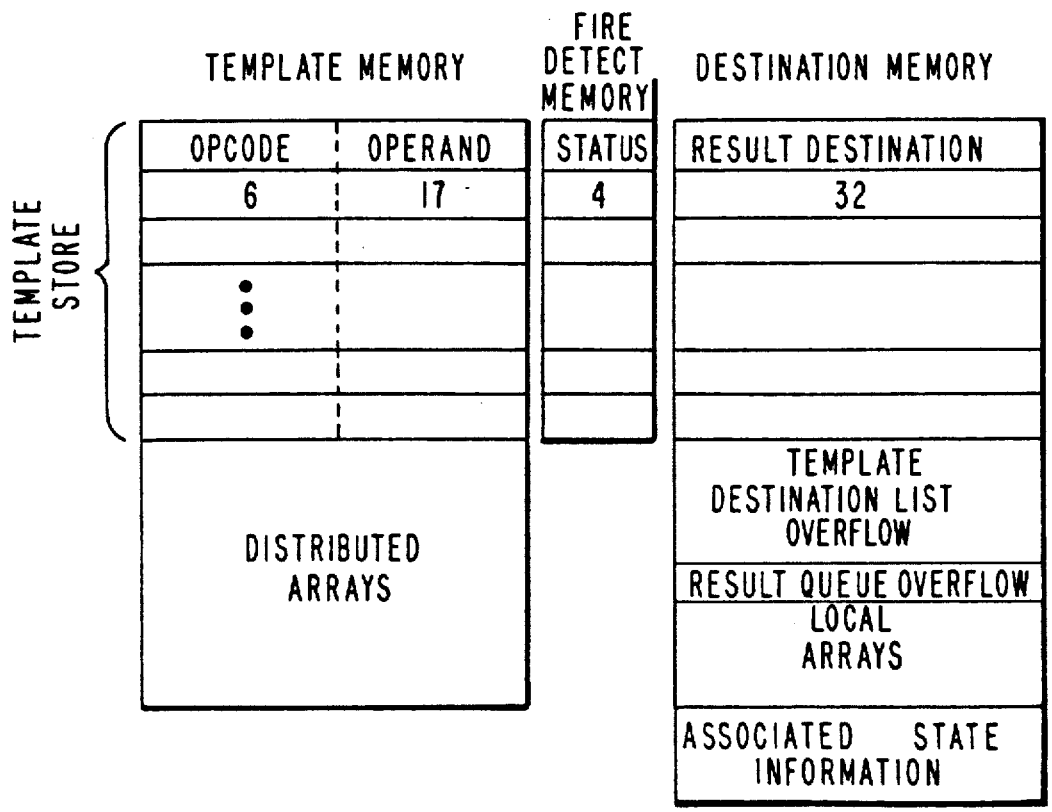

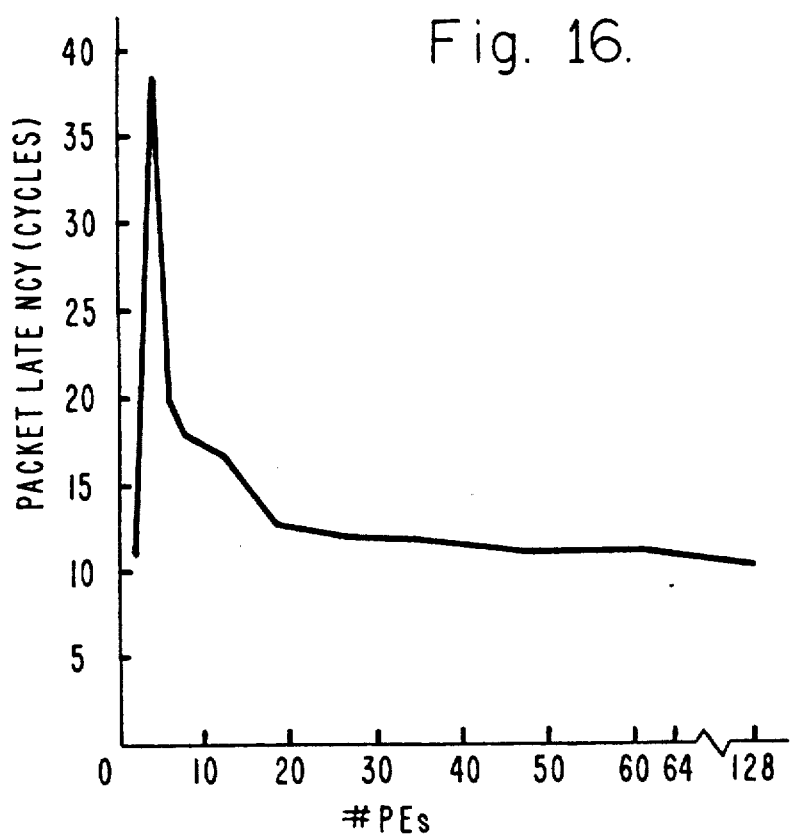

DATA-FLOW MULTIPROCESSOR ARCHITECTURE WITH THREE DIMENSIONAL MULTISTAGE INTERCONNECTION NETWORK FOR EFFICIENT SIGNAL AND DATA PROCESSING

RELATED APPLICATION

This is a continuation of application Ser. No. 145,033, filed Jan. 19, 1988, now abandoned, which is a continuation-in-part of application Ser. No. 06/847,087, filed Mar. 31, 1986, now abandoned.

BACKGROUND OF THE INVENTION

1. Field of the Invention

The present invention relates to methods and apparatus for performing high-speed digital computations of programmed large-scale numerical and logical problems, in particular to such methods and apparatuses making use of data-flow principles that allow for highly parallel execution of computer instructions and calculations.

2. Description of the Technology

In order to meet the computing requirements of future applications, it is necessary to develop architectures that are capable of performing billions of operations per second. Multiprocessor architectures are widely accepted as a class of architectures that will enable this goal to be met for applications that have sufficient inherent parallelism.

Unfortunately, the use of parallel processors increases the degree of complexity of the task of programming computers by requiring that the program be partitioned into concurrently executable processes and distributing them among the multiple processors, and that asynchronous control be provided for parallel process execution and inter-process communication. An applications programmer must partition and distribute his program to multiple processors, and explicitly coordinate communication between the processors or shared memory.

Applications programming is extremely expensive even using current single-processor systems, and is often the dominant cost of a system. Software development and maintenance costs are already very high without programmers having to perform the additional tasks described above. High-performance multiprocessor systems for which software development and maintenance costs are low must perform the extra tasks required for the programmer and be programmable in a high-level language.

There are different classes of parallel processing architectures that may be used to obtain high performance. Systolic arrays, tightly coupled networks of von Neumann processors, and data flow architectures are three such classes.

Systolic arrays are regular structures of identical processing elements (PEs) with interconnection between PEs. High performance is achieved through the use of parallel PEs and highly pipelined algorithms. Systolic arrays are limited in the applications for which they may be used. They are most useful for algorithms which may be highly pipelined to use many PEs whose intercommunications may be restricted to adjacent Pes (for example, array operations). In addition, systolic arrays have limited programmability. They are "hardwired" designs in that they are extremely fast, but inflexible. Another drawback is that they are limited to using local data for processing. Algorithms that would require access to external memories between computations would not be suitable for systolic array implementation.

Tightly coupled networks of von Neumann processors typically have the PEs interconnected using a communication network, with each PE being a microprocessor having local memory. In addition, some architectures provide global memory between PEs for interprocessor communication. These systems are most well suited for applications in which each parallel task consists of code that can be executed efficiently on a von Neumann processor (i.e., sequential code). They are not well suited for taking full advantage of low-level (micro) parallelism that may exist within tasks. When used for problems with low-level parallelism they typically give rise to large ALU (arithmetic and logical unit) idle times.

Data flow multiprocessor architectures based on the data flow graph execution model implicitly provide for asynchronous control of parallel process execution and inter-process communication, and when coupled with a functional high-level language can be programmed as a single PE, without the user having to explicitly identify parallel processes. They are better suited to taking advantage of low-level parallelism than von Neumann multiprocessor architectures.

The data flow approach, as opposed to the traditional control flow computational model (with a program counter), lets the data dependencies of a group of computational operations determine the sequence in which the operations are carried out. A data flow graph represents this information using nodes (actors) for the operations and directed arcs for the data dependencies between actors. The output result from an actor is passed to other actors by means of data items called tokens which travel along the arcs. The actor execution, or firing occurs when all the actor's input tokens are present on its input arcs. When the actor fires, or executes, it uses up the tokens on its input arcs, performs its intended operation, and puts result tokens on its output arcs. When actors are implemented in an architecture they are called templates. Each template consists of slots for an opcode, operands, and destination pointers, which indicate the actors to which the results of the operation are to be sent.

The data flow graph representation of an algorithm is the data dependency graph of the algorithm. The nodes in the graph represent the operators (actors) and the directed arcs connecting the nodes represent the data paths by which operands (tokens) travel between operands (actors). When all the input tokens to an actor are available, the actor may "fire" by consuming its input tokens, performing its operation on them, and producing some output tokens. In most definitions of data flow a restriction is placed on the arcs and actors so that an arc may have at most one input token on it at a time. This implies that an actor may not fire unless all of its output arcs are empty. A more general definition allows for each arc to be an infinite queue into which tokens may be placed.

All data flow architectures consist of multiple processing elements that execute the actors in the data flow graph. Data flow architectures take advantage of the inherent parallelism in the data flow graph by executing in separate PEs those actors that may fire in parallel. Data flow control is particularly attractive because it can express the full parallelism of a problem and reduce explicit programmer concern with interprocessor communication and synchronization.

In U.S. Pat. No. 3,962,706—Dennis et al., a data processing apparatus for the highly parallel execution of stored programs is disclosed. Unlike the present invention, the apparatus disclosed makes use of a central controller and global memory and therefore suffers from the limitations imposed by such an architecture.

U.S. Pat. No. 4,145,733—Misunas et al. discloses a more advanced version of the data processing apparatus described in U.S. Pat. No. 3,962,706. However, the apparatus disclosed still contains the central control and global memory that distinguish it from the present invention.

U.S. Pat. No. 4,145,733—Misunas et al. discloses another version of the apparatus disclosed in the previous two patents, distinguished by the addition of a new network apparently intended to facilitate expandability, but not related to the present invention.

In U.S. Pat. No. 4,418,383—Doyle et al. a large-scale integration (LSI) data flow component for processor and microprocessor systems is described. It bears no substantive relation to the processing element of the present invention, nor does it teach anything related to the data flow architecture of the present invention.

None of the inventions disclosed in the patents referred to above provides a processor designed to perform image and signal processing algorithms and related tasks that is also programmable in a high-level language which allows exploiting a maximum of low-level parallelism from the algorithms for high throughput.

The present invention is designed for efficient realization with advanced VLSI circuitry using a smaller number of distinct chips than other data flow machines. It is readily expandable and uses short communication paths that can be quickly traversed for high performance Previous machines lack the full capability of the present invention for large-throughput realtime applications in data and signal processing in combination with the easy programmability in a high-level language.

The present invention aims specifically at providing the potential for performance of signal processing problems and the related data processing functions including tracking, control, and display processing on the same processor. An instruction-level data flow (micro data flow) approach and compile time (static) assignment of tasks to processing elements are used to get efficient runtime performance.

SUMMARY OF THE INVENTION

The present invention is a data flow architecture and software environment for high performance signal and data processing. The programming environment allows applications coding a in a functional high-level language, the Hughes Data Flow Language, which is compiled to a data flow graph form which is then automatically partitioned and distributed to multiple processing elements. As an alternative for smaller scale problems and for simulation studies, a data flow graph language assembler and local allocator allow programming directly in a data flow graph form.

The data flow architecture consists of many processing elements connected by a three-dimensional bussed packet routing network. The processing elements re designed for implementation in VLSI (very large scale integration) to provide realtime processing with very large throughput. The modular nature of the data-flow processor allows adding more processing elements to meet a range of throughput and reliability requirements. Simulation results have demonstrated high-performance operation.

Accordingly, it is one object of the present invention to provide a data-flow multiprocessor that is a high-performance, fault-tolerant processor which can be programmed in a high-level language for large throughput signal and data processing applications.

It is another object of the present invention, based on data-flow principles so that its operation is data-driven rather than instruction-driven, that it allow fast, highly-parallel computation in solving complex, large-scale problems.

It is a further object of the present invention to provide for an interconnection network for the multiple processing elements that is split up into as many components as there are processing elements, so that the communication network is equally distributed over all the processing elements, and if there are N processing elements, each processing element has 1/N of the interconnection network to support it.

It is yet another object of the present invention to provide for static allocation (that is, at compile time) of the program to the processing elements.

It is still another object of the present invention to use processing elements which have been designed for implementation using only two distinct chips in VLSI (very large scale integration) to provide realtime processing with very large throughput.

Finally, it is an object of the present invention that the modular nature of the data-flow processor allow adding more processing elements to meet a range of throughput and reliability requirements.

An appreciation of other aims and objects of the present invention and a more complete and comprehensive understanding of this invention may be achieved by studying the following description of a preferred embodiment and by referring to the accompanying drawings.

BRIEF DESCRIPTION OF THE DRAWINGS

FIG. 3 shows how a data packet consists of a packet type, a PE and template address, and one or more data words.

FIG. 5 shows how templates and arrays are mapped into physical memories.

FIG. 16 is a plot of average communication packet latency (in clock cycles) versus number of processing elements for nontransitive closers allocation of the program radarb.

DESCRIPTION OF A PREFERRED EMBODIMENT

Figure 1:
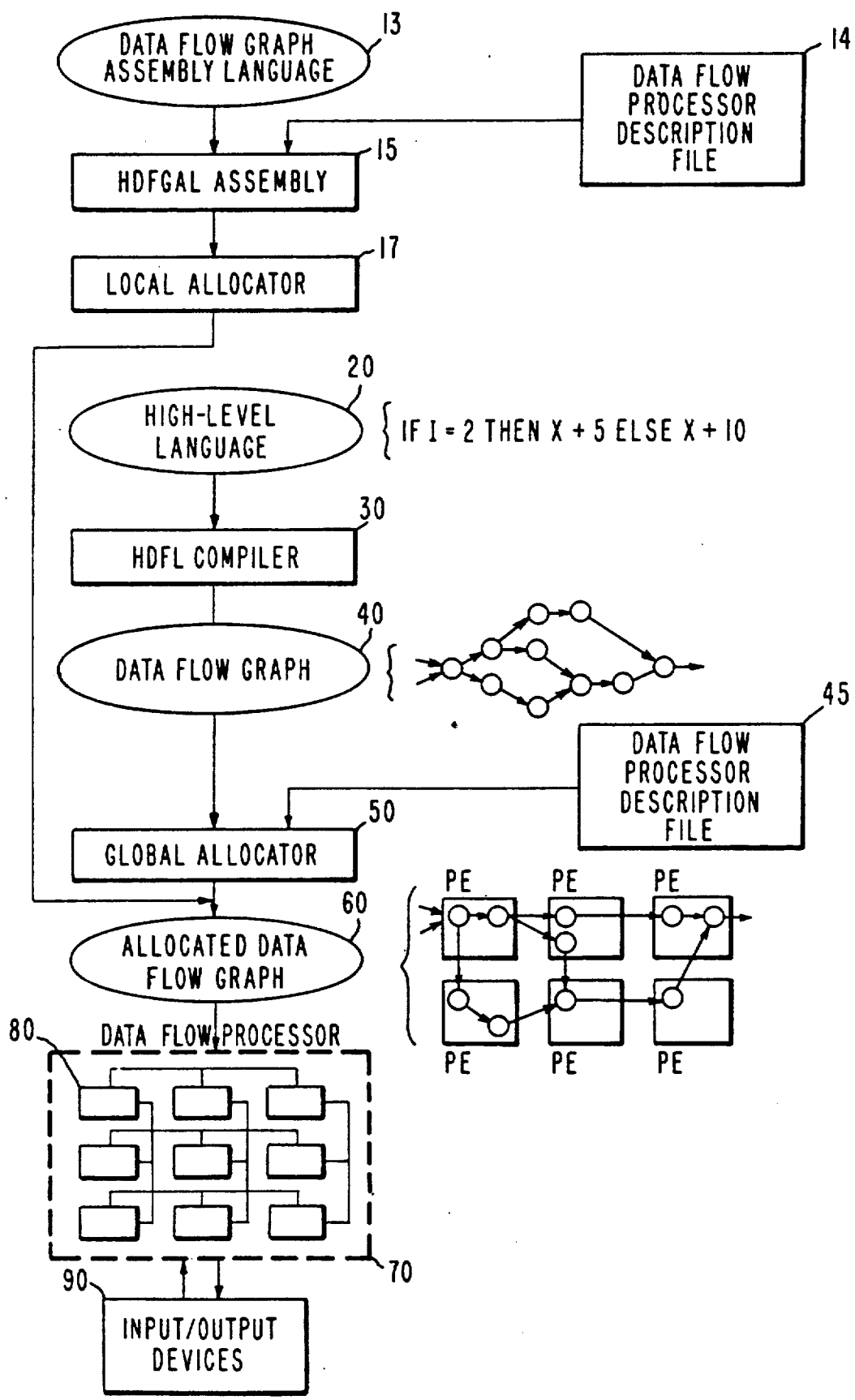
FIG. 1 is a schematic block diagram of the present invention, with illustrative information about some of its parts to the right of the block diagram.

FIG. 1 is a schematic block diagram of the present invention, a data flow architecture and software environment 10 for high-performance signal and data processing. The programming environment allows applications coding in a functional high-level language which results in a program file 20 which is input into a compiler 30 which converts it to a data flow graph form 40 which a global allocator 50 then automatically partitions and distributes to multiple processing elements 80. In the case of smaller problems, programming can be done in a data flow graph and assembled by an assembler 15 that operates directly on an input data flow graph file 13 whose output is then sent to a local allocator 17 for partitioning and distribution. In the former case a data flow processor description file 45 is read into the global allocator 50 and in the latter case a data flow processor description file 14 is read into the assembler 15. The data flow processor 70 consists of many processing elements 80 connected in a three-dimensional bussed packet routing network. Data enters or leaves the processor 80 by means of input/output devices 90 connected to the processor.

THE THREE DIMENSIONAL BUSSED NETWORK

Figure 2:
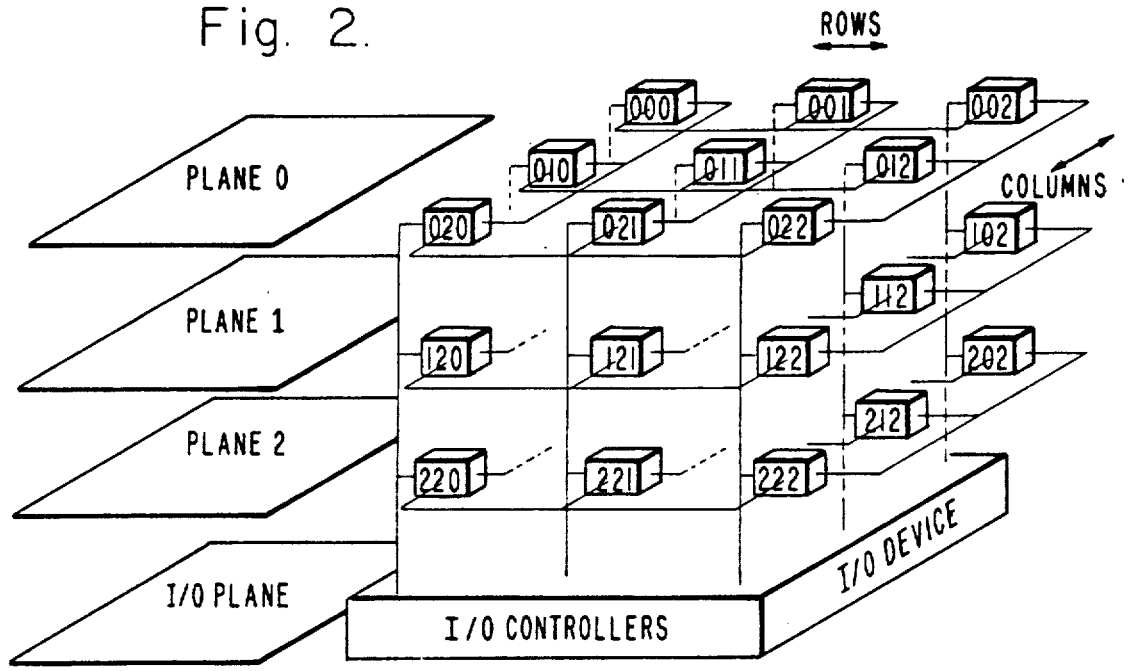
FIG. 2 is a schematic representation of how the processing elements are connected together in a three-dimensional bussed packet routing network.

As shown in FIG. 2, the data flow processor 70 comprises 1 to 512 identical processing elements connected by a global inter-PE communication network. This network is a three-dimensional bussed network in which the hardware implements a fault-tolerant store-and-forward packet-switching protocol which allows any PE to transfer data to any other PE. Each processing element contains queues for storing packets in the communication network, and the appropriate control for monitoring the health of the processing elements and performing the packet routing.

In the three-dimensional bussed interconnection network not all processing elements are directly connected, so a store-and-forward packet routing technique is used. This algorithm is implemented in the communication chip 81 (FIG. 4), which connects a processing chip 80 to the row, column, and plane buses 82, 84, 86. The communication chip 81 acts like a crossbar in that is takes packets from its four input ports and routes them to the appropriate output ports. In addition, it provides buffering with a number of first-in-first-out queues, including the processor input queue 112 and processor output queue 114.

The three-dimensional bussed network is optimized for transmission of very short packets consisting of a single token. As shown in FIG. 3, each packet consists of a packet type, an address, and a piece of data. Different types of packets include normal token packets, initialization packets, and special control packets for machine reconfiguration control. The address of each packet consists of a processing element address and a template address which points to one particular actor instruction within a processing element. The data can be any of the allowed data types of the high-level data flow language or control information if the packet is a control packet.

A configuration of up to 8×8×8 or 512 processing elements can be physically accommodated by the communication network. Many signal processing problems could potentially use this many processing elements without overloading the bus capacity because of the ease of partitioning these algorithms. However, for general data processing the bus bandwidth will start to saturate above four processing elements per bus. More processing elements can be added and performance will increase but at lower efficiency per processing element.

A single-path routing scheme scheme is used in transferring packets between PEs. In other words, the same path is used every time packets are sent from a given source PE to a given sink PE. This guarantees that packets sent from and actor in the given source PE to an actor in the given sink PE arrive in the same order in which they were sent, which is necessary when actors are executed more than once (as, for example, when the graph is pipelined).

Each PE continually monitors its plane, column, and row buses looking for packets it should accept. PEs accept packets addressed directly to them and packets that need to be rerouted to other PEs through them. For example, if a packet is put on a plane bus, all PEs on that bus examine the packet address and the PE whose plane address matches the packet's plane address accepts the packet.

FAULT TOLERANE

The communication network is designed to be reliable, with automatic retry on garbled messages, distributed bus arbitration, alternate-path packet routing, and failed processing element translation tables to allow rapid switch-in and use of spare processing elements.

Static fault tolerance is fully supported. Upon determination of a PE failure, a spare PE can be loaded with the templates from the failed PE and operation continued. This creates two problems, however: 1) the spare PE has a different address than the PE it replaced, and 2) messages that were to be routed through the failed PE must instead be routed around it.

The first problem is solved by two methods. In the long term (days to months) the applications program can be reallocated using the allocator software during a scheduled maintenance period. For immediate recovery (several seconds), a small number of failed PE address translation registers, called the error memory 110, are provided in each PE. When a PE fails, its address is entered in the error memory 110 followed by the address of its replacement PE. Each packet generated is checked against the error memory and if a match is made, the replacement address is substituted for the address of the failed PE.

Routing of packets around failed PEs is accomplished by each PE keeping track of which directly connected PEs are operative and which have failed. In the case of failed PEs the sending PE routes packets to alternate buses.

Dynamic fault tolerance can be provided by running two or more copies of critical code sections in parallel in different PEs and voting on the results. Unlike difficulties encountered in other types of parallel processors, the data flow concept avoids synchronization problems by its construction, and interprocess communication overhead is minimized because it is supported in hardware. This software approach to dynamic fault tolerance minimizes the extra hardware required for this feature.

PACKETS

The packets that are transferred contain either 16-bit or 24-bit token values (see FIG. 3). The data paths are 17 bits wide: 16 data bits plus 1 tag bit. Each packet contains six type bits, a PE address, an actor address, and the data being transmitted from one actor to another. The PE address identifies the destination PE and the actor address identifies the actor within the PE to which data is being sent. The PE address is 9 bits (3 bits for each plane, column, and row address) and can be used to address up to 512 distinct PEs (such as there would be in an 8×8×8 cubic arrangement of PEs). Variable-length packets are supported by the network protocol, with the last word of a packet transmission indicated by an end-of-packet bit.

THE PROCESSING ELEMENT

Figure 4:
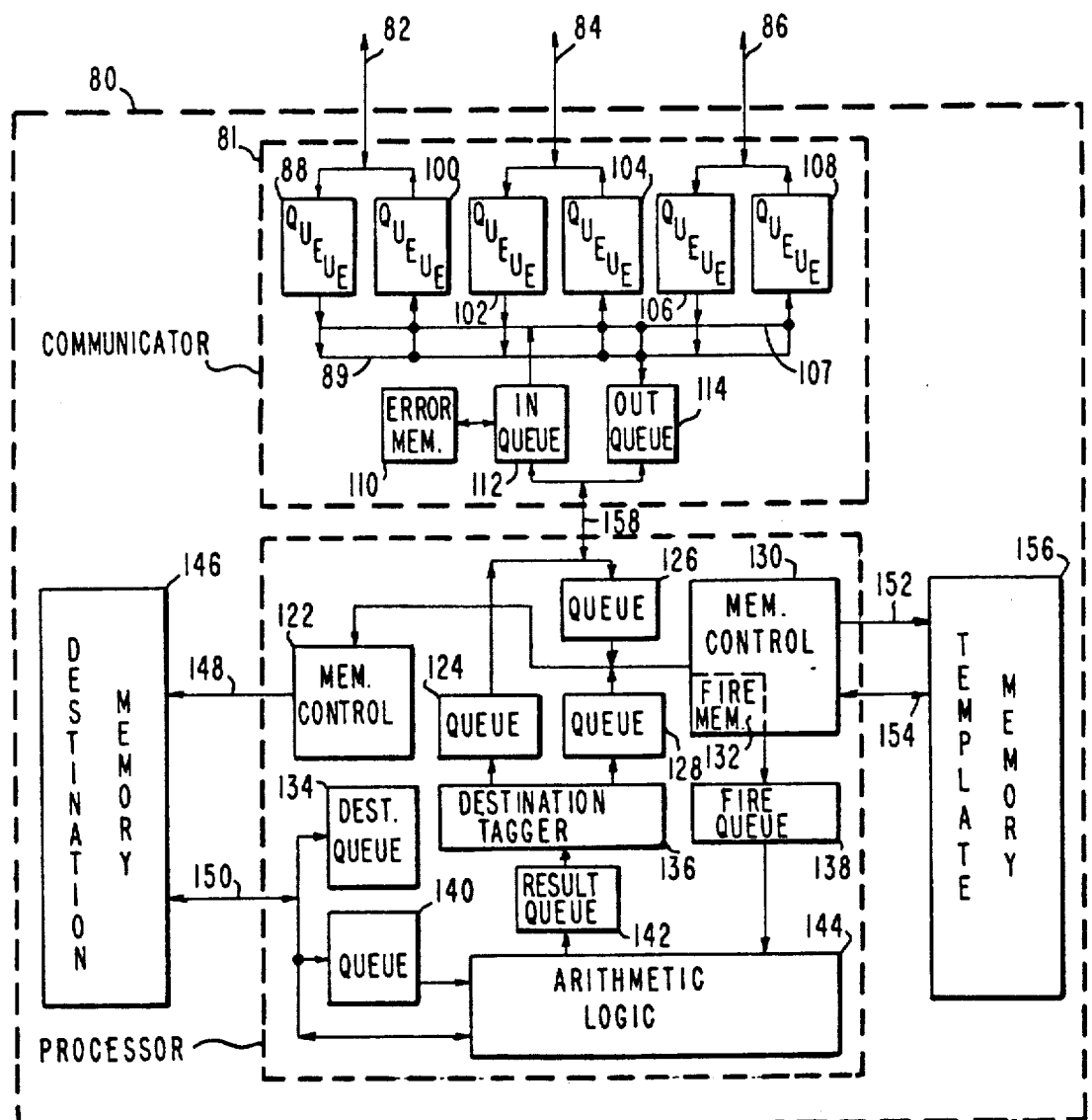
FIG. 4 illustrates the organization of a processing element in schematic block diagram form.

Each processing element 80 consists of a communications chip 81, a processing chip 120, and memory as shown in FIG. 4. The communication network is distributed over all the PEs for improved fault tolerance. The part of the communications network associated with a single PE is represented in FIG. 4 by external plane, column, and row buses 82, 84, 86. The external buses 82, 84, 86 use parity, a store-and-forward protocol, and a two-cycle timeout that indicates a bus or PE failure if the packet reception signal is not received within two cycles. The parity and timeout features are used for error detection. The store-and-forward protocol is necessary because the input queue at the receiving communication chip may be full, in which case the sending communication chip needs to retransmit the packet later. The arbitration control of the external buses 82, 84, 86 is decentralized for high reliability. Pairs of input/output queues 88, 100; 102, 104; and 106, 108 are used to buffer the data entering or leaving via the external plane, column, and row buses 82, 84, 86. Two internal buses 89 and 107 are used for sending packets from the processing chip plane, column, and row input queues 88, 102, 106 to the processor plane, column, and row output queues 100, 104, 108. All of the buses use round robin arbitration.

The communication chip 81 accepts tokens addressed to actors stored in its associated processing chip 120 and passes them to it. An error memory 110 in the communications chip 81 contains a mapping of logical PE addresses to physical PE addresses. Normally the two are the same, but if a PE fails, its logical address is mapped to the physical address of one of the spare PEs.

Static fault tolerance is used. When a PE fails, self-test routines are used to determine whether the failure is temporary or permanent. If it is permanent, the code that was allocated to the failed PE must be reloaded into the spare PE that will have the address of the failed PE. The program must then be restarted from the last breakpoint. The communication chip is highly pipelined so that it can transmit a word of a packet almost every cycle. About 5 to 6 million packets per second can be transmitted by the communication chip.

This arrangement for the processing element was chosen to simplify VLSI design. There were only two VLSI chip types to design, and partitioning the PE into the communication chip 81 and the processing chip 120 minimized the number of input/output pins per chip.

Both chip types are custom designed VHSIC 1.25 micron CMOS/SOS chips operating at 20 MHz.

Each individual PE is a complete computer with its own local memory for program and data storage. Associated with each processing chip are two random access memories (RAMs) 146 and 156 that store the actors allocated to the PE. These two memories, the destination memory 146 and template memory 156, are attached to processing chip 120. Each is composed of multiple RAM chips and has an access time of less than 80 nanoseconds, with two cycles required per memory access. A single bidirectional bus 158 is used to communicate between the communication chip 81 and the processing chip 120.

The processing chip contains four special-purpose microprocessors which may be called "Micromachines".

The processing chip 120 accepts tokens from the communications chip 81 and determines whether each token allows an actor to fire. If not, the token is stored until the matching token or tokens arrive. If a token does enable an actor, then the actor is fetched from memory and executed by an ALU micromachine 144 in the processing chip 120. The resulting value is formed into one or more tokens and they are transmitted to the other actors that are expecting them.

The memory attached to each processing chip is used to store actors represented as templates. A template consists of a slot for an opcode, a destination list of addresses where results should be sent, and a space for storing the first token that arrives until the one that matches it is received.

The memory is also used to store arrays, which can be sent to the memory of a single processing element or distributed over many processing elements. With distributed arrays, it is possible for an actor executing in one processing element to need access to an array value stored in the memory of another processing element. Special actors are provided in the architecture for these nonlocal accesses Given the array index or indices, the address of the processing element containing the value is calculated based on the way the array is distributed, and a request for the value is sent via the communication network. The other processing element then responds by sending back the requested value as a normal token. Nonlocal array updates are handled similarly.

The processing chip is a pipelined processor with the following three operations overlapped: 1) instruction/operand fetch and data flow firing rule check, 2) instruction execution, and 3) matching results with destination addresses to form packets. There is some variance in the service times of each of these units for different instructions, so queuing is provided between the units as shown in FIG. 4.

Queuing between the communications chip 81 and the template memory controller 130 is provided by the From Communication Queue 126, for tokens arriving from the bidirectional bus 158, and by the External Queue 124, for tokens leaving via the bidirectional bus 158. Tokens formed by the destination tagger micromachine 136 that are addressed back to the same processing element (PE) 80 are buffered in the feedback queue 128 until they are fetched by the template memory controller 130. This feedback path allows tokens addressed to the same PE 80 to bypass the global inter-processing element communication at work which improves communication speed.

The instruction fetch and data flow firing rule check is performed by two parallel micromachine units, the template memory controller 130 and the destination memory controller 122. The templates are spread across three independent memories: the fire detect memory 132, the template memory 156, and the destination memory 146. The first 4k locations of each of these memories contain addresses of actors. The fire detect memory 132 only has 4k locations. The template memory 156 and destination memory 146 have additional memory that is used to store variable-length data associated with each actor, array data, and queue overflow data. The templates are split between the three memories so that the template memory controller 130 and destination memory controller 122 can operate in parallel and thus prepare actors for firing more quickly than if one memory and one controller were used.

When a packet arrives at the processing chip, the status of the template to which the packet is addressed is accessed from the fire detect memory 132 and a decision is made on whether the template is ready to fire. The status bits are stored in the on-chip fire detect memory 132 to allow fast access and update of template status. If the template is not ready to fire, the arriving token (operand) is stored in the template memory 156.

If the template is ready to fire, the template memory controller 130 fetches the template opcode and operand stored in the template memory 156, combines them with the incoming operand, which enabled the actor to fire, and sends them to the firing queue 138, from which the arithmetic and logic unit (ALU) micromachine 144 will fetch them. Simultaneously, the destination memory controller 122 begins fetching the destination addresses to which the template results should be sent and stores these addresses in the destination queue 134. Since each result of each template (actor) may need to be sent to multiple destinations, the destination memory 146 includes an overflow storage area to accommodate lists of destinations for each result of each actor. The destination memory 146 also includes storage for state information associated with certain primitive actor instructions. This associated state information is fetched from the destination memory 146 and buffered in the associated information queue 140 until it is fetched by the arithmetic logic unit (ALU) micromachine 144. FIG. 5 shows how templates and arrays are mapped into physical memories.

The results of the actor execution performed in the ALU micromachine 144 are put into the result queue 142. The results in the result queue 142 and the destinations in the destination queue 134 are combined together into packets by the destination tagger micromachine 136 and sent back to the template memory controller 130 (via the feedback queue 138) or to other PEs (via the to-communication queue 124).

To summarize, the four main functions of a processing element are communication network processing, actor fire detection, actor execution, and result token formation. All four of these functions are performed concurrently in a pipelined fashion.

A stand-alone processing element is capable of performing 2 to 4 million operations per seconds (MOPS) depending on the instruction mix used. In this case an operation is defined as a primitive actor instruction; these vary in complexity from a simple 16-bit add which is completed in one micro-instruction to some array addressing instructions which take over ten cycles, or a 16-bit divide which takes approximately 25 cycles.

Two separate memory interfaces 148, 150 and 152, 154 allow a large memory-processor bandwidth which is necessary to sustain high performance. The design goal of minimizing chip types and power consumption resulted in a simple design for the ALU: there is no hardware multiply -- multiplication is performed by a modified Booths algorithm technique. Each of the chips has less than 150 pins, consists of approximately 15k gates, and operates at a clock rate of 20 MHz.

SOFTWARE ENVIRONMENT

The preferred embodiment of the present invention is programmed in the Hughes Data Flow Language (HDFL), which is a high-level functional language. A record of the HDFL program 20 is read into the compiler 30 which translates it into a parallel data flow graph form 40 which along with a description of the processor configuration 45 is fed into the global allocator 50 for distribution to the multiple processing elements 80. The allocator employs static graph analysis to produce a compile-time assignment of program graph to hardware that attempts to maximize the number of operations which can proceed in parallel while minimizing the inter-PE communication.

Since one of the primary goals of the present invention is to provide a high-level language programming capability in order to reduce software cost, a high-level language had to be found in which the parallelism inherent in many problems could be easily expressed. Current sequential languages such as FORTRAN and Pascal were eliminated because of their inherent lack of parallelism. Ada and other multi-tasking languages were rejected because they require explicit programmer concern with creating and synchronizing multiple tasks, which adds complexity and cost to software development. Within a specific process, these languages are also subject to the same lack of parallelism as the FORTRAN-class languages. It was determined that an applicative data flow language such as VAL (see "The VAL Language: Description and Analysis," by J. R. McGraw, in ACM Transactions on Programming Languages and Systems, Volume 6, Number 1, January 1982, pages 44 through 82) or Id (see "The (Preliminary) Id Report," by Arvind et al., Department of Computer Science, TR114a, University of California, Irvine, May 1978) would allow an effective extraction of parallelism and efficient mapping to multiprocessor hardware using current compiler technology. This led to the development of the Hughes Data Flow Language (HDFL), which is a general purpose high-level programming language for data flow computers. The HDFL is designed to allow full expressing of parallelism. It is an applicative language but includes the use of familiar algebraic notation and programming language conventions.

The Hughes Data Flow Language is value oriented, allowing only single-assignment variables. Its features include strong typing, data structures including records and arrays, conditionals (IF THEN ELSE), iteration (FOR), parallel iteration (FORALL), and streams. An HDFL program consists of a program definition and zero or more function definitions. There are no global variables or side effects; values are passed via parameter passing.

Immediately below is shown a simple illustrative example of HDFL:
    type xy = record [x:integer; y:integer];
    constant scalefactor = 2; % this is a comment.

function foo (xyvar:xy; x0, y1, y2:integer returns xy, integer)
    constant offset = 1;
    result:

```
xy( xyvar.x + x0, xyvar.y + y1),
if y1 > y2 %Either branch creates a single value,
    then y2 * scalefactor + offset
    else y1 + x0
endif
endfun
```

The example shown immediately above consists of a function "foo" which takes four parameters (one record and three integers), and returns one record and one integer. "Result" is a keyword beginning the body of a function and "endfun" terminates it. The function body consists of a list of arbitrarily complex expressions separated by commas with one expression per return value. In this example the first expression in the function body is a "record type constructor" which assigns values to the fields of the record result. The conditional below it evaluates to an integer value. Constants and types may be declared before the function header or before the body. Functions may be nested.

HDFL COMPILER

The HDFL compiler 30 translates an HDFL program file 20 into a data flow file 40. The translation is performed using standard compiler techniques; however, the HDFL compiler 30 is an essential component in achieving the capability of programming multiple parallel processing elements via a single high level language program, this being one of the primary goals of the present invention.

HDFL compilation is performed in four passes corresponding to syntax checking, type checking, code generation, and optimization. The first three passes are performed using standard table-driven techniques. A translation table generator (TTG) is used to translate from a modified Backus-Naur form called table generator input form (TGIF) to internal form. In principle, any LR(1)-capable compiler-compiler could perform the same task.

Pass 1 performs syntax checking with limited error recovery, and builds a machine-readable parse tree. This is a standard table-driven technique. Pass 2 performs scope and type checking, taking parse tree nodes as input tokens and producing a new augmented parse tree, This also is a standard technique.

Pass 3 performs intermediate code generation by converting the parse tree into a data flow graph whose nodes represent machine instructions (as ADDs and MULTIPLIPIES) and also higher level operations (such as array operations). The higher level operations are converted into multiple machine instructions at a later stage. For example, array access operations are converted into machine instructions only after allocation has been performed to determine whether the array is stored in a single PE or distributed over many PEs. The parse tree and the data flow graph are linked together as shown schematically in FIG. 18, which will be explained further in a discussion of allocation, below.

Pass 4 performs conventional optimizations: propogate constants, eliminate duplicate code and dead code, balance trees of associative operations, convert function invocations to inline code where feasible, remove code from loops (code hoisting), and other such optimizations including a converting of multiplies to shifts and adds (strength reduction). No innovative techniques are employed, although tree balancing is performed less frequently by other compilers.

Figure 6:
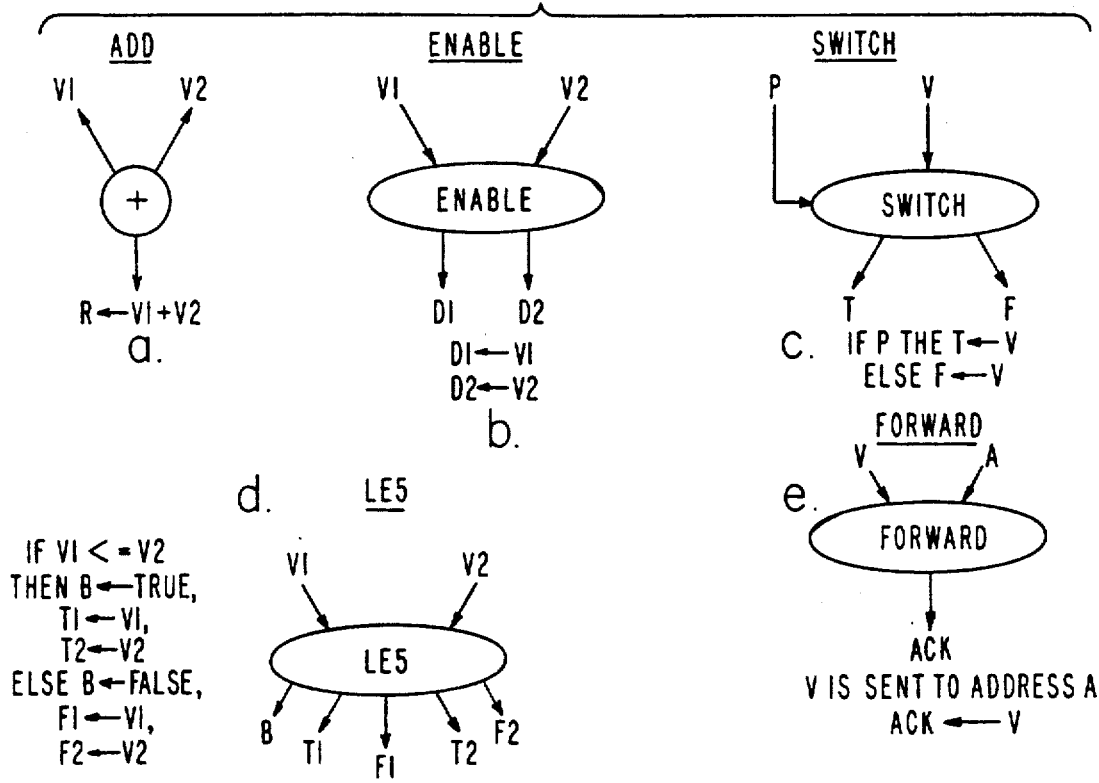
FIG. 6 gives examples of some primitive actors which are implemented directly in hardware.

The primitive actors are those supported directly by the hardware. Some of the actors are in 16-bit form and others are in 32-bit form. Many are simple arithmetic and Boolean actors such as ADD, others are control actors such as ENABLE and SWITCH, or hybrids like LE5, some are used in function invocation such as FORWARD, and others are used for array and stream handling. FIG. 6 shows some of the primitive actors implemented directly in hardware.

Figure 7:
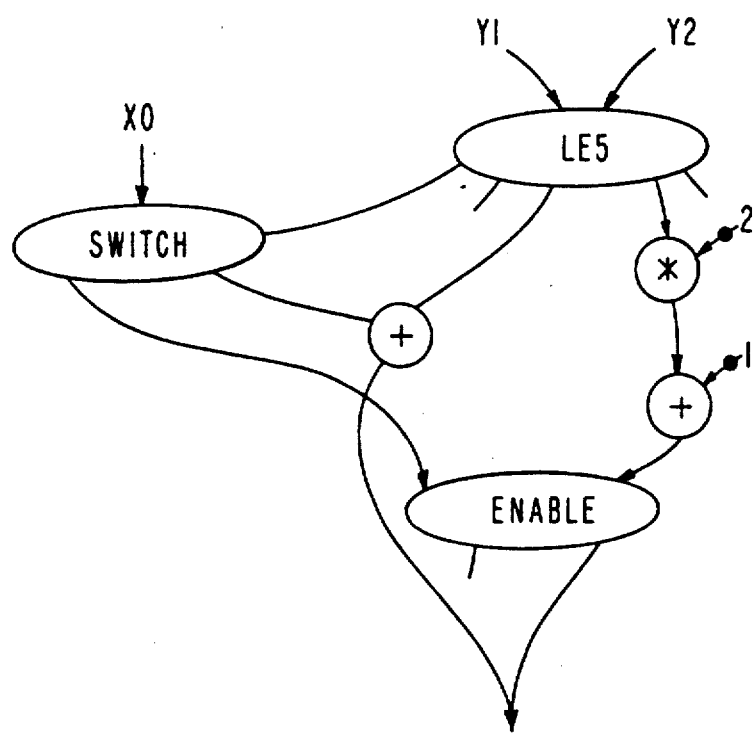
FIG. 7 shows an example of a compiler generated data flow graph corresponding to the expression "if y1 < = y2 then y2*2+1 else y1+x0 endif".

For each construct in the high-level language the compiler has a corresponding data flow graph made up of primitive actors that implements that function. For example, the data flow graph generated from the HDFL conditional expression "if y1<=y2 then y2*2+1 else y1+x0 endif" is shown in FIG. 7. The "then" and "else" branches of the conditional are merged together by sending tokens on these arcs to the same location; this is indicated by merging the output arcs together Note also that the LE5 actor has some stub output arcs which are not used. The ENABLE actor is present so that when the result of the expression is generated this guarantees that all actors in the graph have fired and the graph is available for further use if desired.

THE ALLOCATOR

Before a compiled program can be executed on a computer, the instructions must be loaded into the memory of the computer. For a conventional sequential computer, this usually is a well-known conventional process because the instructions can be read into memory. Possibly, the reading into memory may require a changing of certain addresses relative to an absolute set of addresses, or other relatively simple transformations. However, in the case of a parallel multiprocessor computer, as is the case of the present invention, the process of loading the instructions into the computer is known as "allocation", the allocation being a much more complex process than the process of entering instructions into the conventional sequential computer. The instructions of the program of the parallel multiprocessor computer must be partitioned into groups, and each group must be assigned to one of the processing elements (PEs) of the multiprocessor. In other words, an instruction must be loaded into the local memory of the PE that is to execute that instruction during run-time because a PE can only execute instructions stored in its own local memory. The allocation process is an important step in our objective of being able to program the multiprocessor efficiently with a single high level language program because the assignment of instructions to processing elements can have a large impact on the performance of the multiprocessor. For example, since each PE is a sequential computer, instructions that potentially can fire in parallel cannot do so if they are assigned to the same PE. Performance can also be affected by data communication delays in the inter-Pe communication network. It takes many more clock cycles to transmit a token from one Pe to another than it does to transmit a token from one actor to another in the same PE, which bypasses the communication network completely.

This leads to three goals for efficient allocation: 1) minimize inter-PE communication by assigning instructions connected in the graph to the same processing element, 2) maximize use of the parallelism of the graph by assigning instructions that can fire in parallel to separate processing elements, and 3) balance the computational load as evenly as possible among the processing elements.

The assignment of the instructions to PE's can be formed statically or dynamically. Static allocation refers to the case wherein the assignment is performed once at compile-time, and remains fixed during the execution of the program. Dynamic allocation refers to the case wherein the assignment of an instruction to a PE can be changed during the execution of the program, such that an instruction could be assigned to a PE each time the instruction is to be executed.

Although dynamic allocation offers the potential to achieve better assignments, this situation being closer to meeting the three goals enumerated above, the dynamic allocation introduces significant overhead because the assignment must be performed in parallel with the actual computation. Since it is an object of the present invention to perform signal and data processing applications efficiently in a real-time environment, the static allocation approach is preferred, thereby to avoid the varying overhead associated with dynamic allocation.

In concert with the development of the data flow architecture and the high-level language compiler 30, an allocation algorithm was implemented. To begin with in getting simulation results, a smaller-scale version called the local allocator 17 was implemented.

THE LOCAL ALLOCATOR

The input to the local allocator 17 is a file 13 containing a data flow graph in the form of a sequence of data records which are sometimes referred to as "templates". Each template represents one actor and lists the opcode of the operator it represents and the data dependency arcs emanating from it. This file also lists arrays, each of which will be assigned to a single processing element or distributed over many processing elements A file 14 describing the configuration of the data flow multiprocessor 70 to be allocated onto is also read into the local allocator 17, specifying how many processing elements 80 there are in each dimension of the three-dimensional packet routing network connecting the PEs. For simulation purposes the output of the local allocator 17 consists of two files. The first file specifies the mapping of each actor of the graph to a memory location in one of the processing elements, and the second file specifies how arrays have been assigned to specific blocks of memory in one or more processing elements These files can then be read into the architectural simulator to initialize the simulated machine.

The local allocator 17 begins by topologically sorting the actors of the graph using a variation of breadth-first search (for a description see The Design and Analysis of Computer Algorithms, by Aho et al., published by Addison-Wesley, 1974). In topologically sorted order, the actors that receive the inputs of the graph are first, followed by the actors that receive arcs from the first actors, and so on. (For this purpose we can ignore cycles in the graph by disregarding back arcs to previously seen actors.) The next step is to compute the transitive closure of the data flow graph, which is defined in the discussion of heuristics below.

Figure 19:
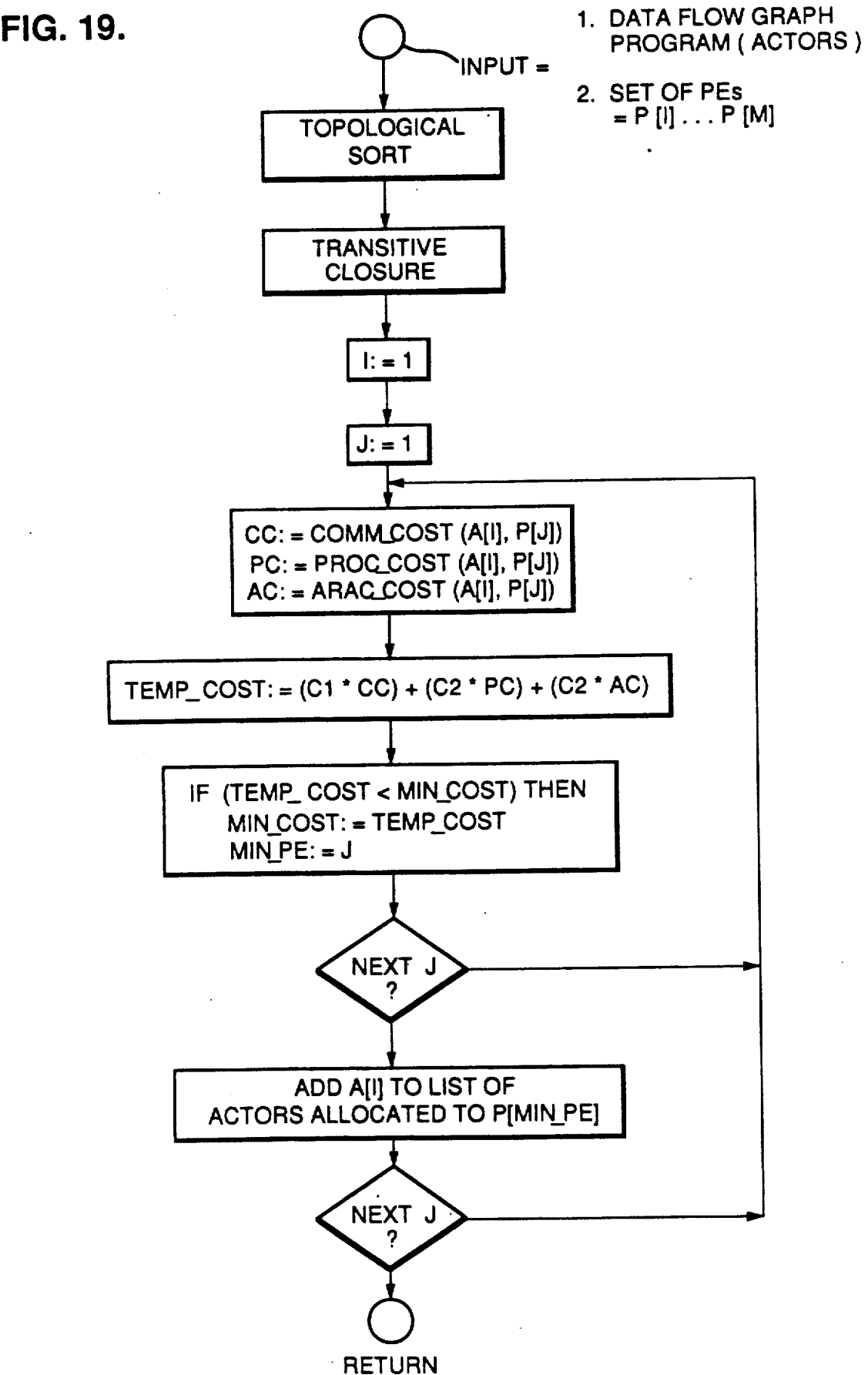
FIG. 19 is a flowchart of the portion of a Local Allocator that statistically allocates actors to PEs for maximal performance.

The local allocator then sequentially processes the sorted list of actors in the graph and assigns each actor to one of the processing elements To choose the best PE for an actor, the algorithm applies several heuristic cost (See FIG. 19) functions to each of the PEs, takes the weighted sum of the results, and uses the PE with the lowest cost. These heuristics are defined in detail in the following paragraphs.

The weights for the weighted sum influence the assignment, and reflect the relative importance of the three goals set forth above. The optimal values are somewhat dependent on architecture, namely, with respect to the speed of the communication network relative to the speed of the PEs. Their values are best determined by simulations of different allocations of the same graph program.

Currently three basic heuristics are implemented: communication cost, array-access cost, and parallel processing cost. The communication and array-access cost functions correspond to the goal of minimizing inter-PE communication traffic, and the parallel processing cost function corresponds to the goal of maximizing parallelism.

The communication cost function takes an actor and a PE and returns an approximate measure of the traffic through the network which would result from assigning the given actor to the given PE. In general, when two actors are connected, the further apart they are allocated, the higher the communication cost.

The heuristic function uses a distance function to determine how far apart PEs are in the three-dimensional bussed communication network. For example, if two PEs are on a common bus, then the distance between them is "one hop," because a token will have to traverse one bus to travel from one to the other. The distance between a PE and itself is zero hops, because the communications network can be bypassed in transmitting a token in this case.

The value of the communication cost function for a given actor and a given candidate PE is defined in the following way. For each previously allocated actor connected to an input arc of the given actor, a determination is made, via the distance function, of the distance from the PE containing the actor on the input arc to the given candidate PE. This is followed by taking the sum of the distances as the value of the communication cost function.

Because the actors are assigned in topologically sorted order, when an actor is about to be allocated most of the actors that it receives input tokens from have already been allocated. Using the distance function between PEs, the communication cost function determines how far through the communication network each input token would have to travel if the actor were assigned to the given PE. The value of the communication cost function is just the sum of these distances.

The processing cost heuristic uses the transitive closure of the data flow graph to detect parallelism. The transitive closure of a directed graph is defined to be the graph with the same set of nodes and an arc from one node to another if and only if there is a directed path from one node to another in the original graph. Algorithms to compute the transitive closure of a given graph in the form of a matrix are well known. In the worst case this computation requires time proportional to the cube of the number of nodes (actors).

Transitive closure is closely related to parallelism in data flow graphs, because two actors can fire in parallel unless there is a directed path from one to the other in the graph, which would force them to be executed sequentially Thus, two actors can fire in parallel unless they are directly connected in the transitive closure of the graph. This fact is used in the parallel processing cost heuristic to determine which actors should be assigned to separate PEs in order to maximize the parallelism of the allocated graph. The parallel processing cost, heuristic cost function, is defined to return a higher cost when potentially parallel actors (according to the transitive closure) are assigned to the same PE. The exact values returned are irrelevant because only the relative differences between cost functions are compared during allocation.

The local allocator attempts to allocate actors that access an array close to the array, guided by the array-access cost function. This heuristic function is readily accomplished and is a generalization of the communication cost. It measures the traffic through the network which would result from assigning a given actor that accesses an array to a given processing element, depending on how far away the array is assigned.

Figure 20:
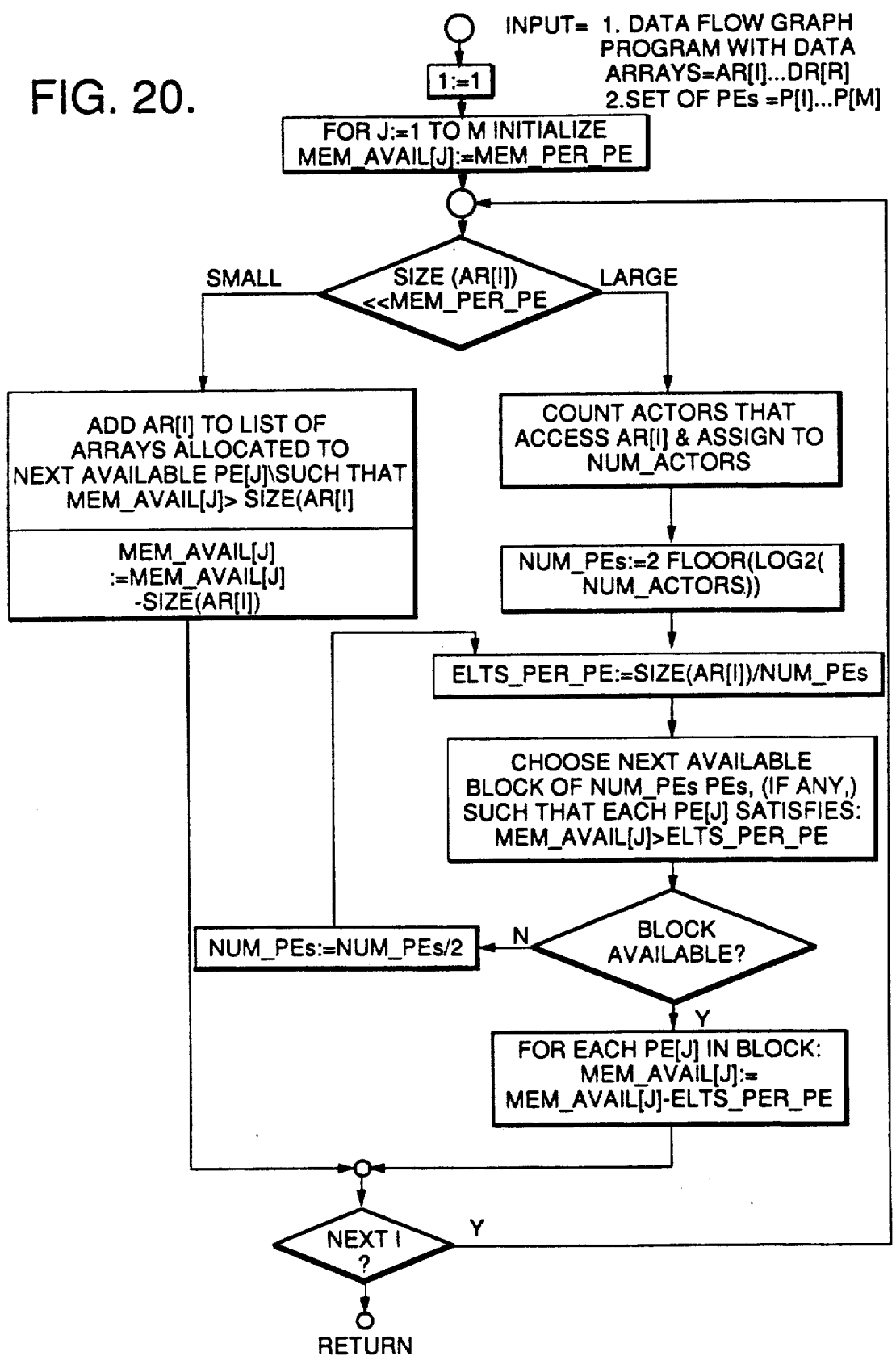
FIG. 20 is a flowchart of the portion of the Local Allocator that statistically allocates arrays to the distributed memory.

The local allocator allocates each array to one or more PEs using similar heuristics (see FIG. 20). For small arrays with a small number of actors that access it, the local allocator will choose to confine the array to a single PE in order to speed up access time. If an array is large and has a large number of actors that can access it in parallel according to the transitive closure, the program will attempt to distribute the array over many PEs. "Small" and "large" are parameters that depend on the architecture, namely, the exact amount of memory for arrays attached to each PE. The array allocation heuristics and the array access cost heuristic (which is used to assign actors that access arrays), have the effect of causing the actors that access arrays to be distributed over the PEs to decrease contention for access to the arrays.

THE GLOBAL ALLOCATOR

The global allocator program 50 combines the heuristic approach from the local allocator 17 with a divide-and-conquer strategy, enabling it to operate on large graphs. Like the local allocator, it accepts a data flow graph 40 and information about the dimensions of the processor 45. It also accepts a hierarchical representation of the syntactic parse tree from the compiler 30 to guide the allocator as it partitions the graph into parallel modules. By integrating the compiler and the allocator in this way, the allocator is able to take advantage of the way the high-level programmer chose to partition the writing of the program into functions, subfunctions, and expressions. We refer to this as "syntax-directed partitioning."

Figure 17:
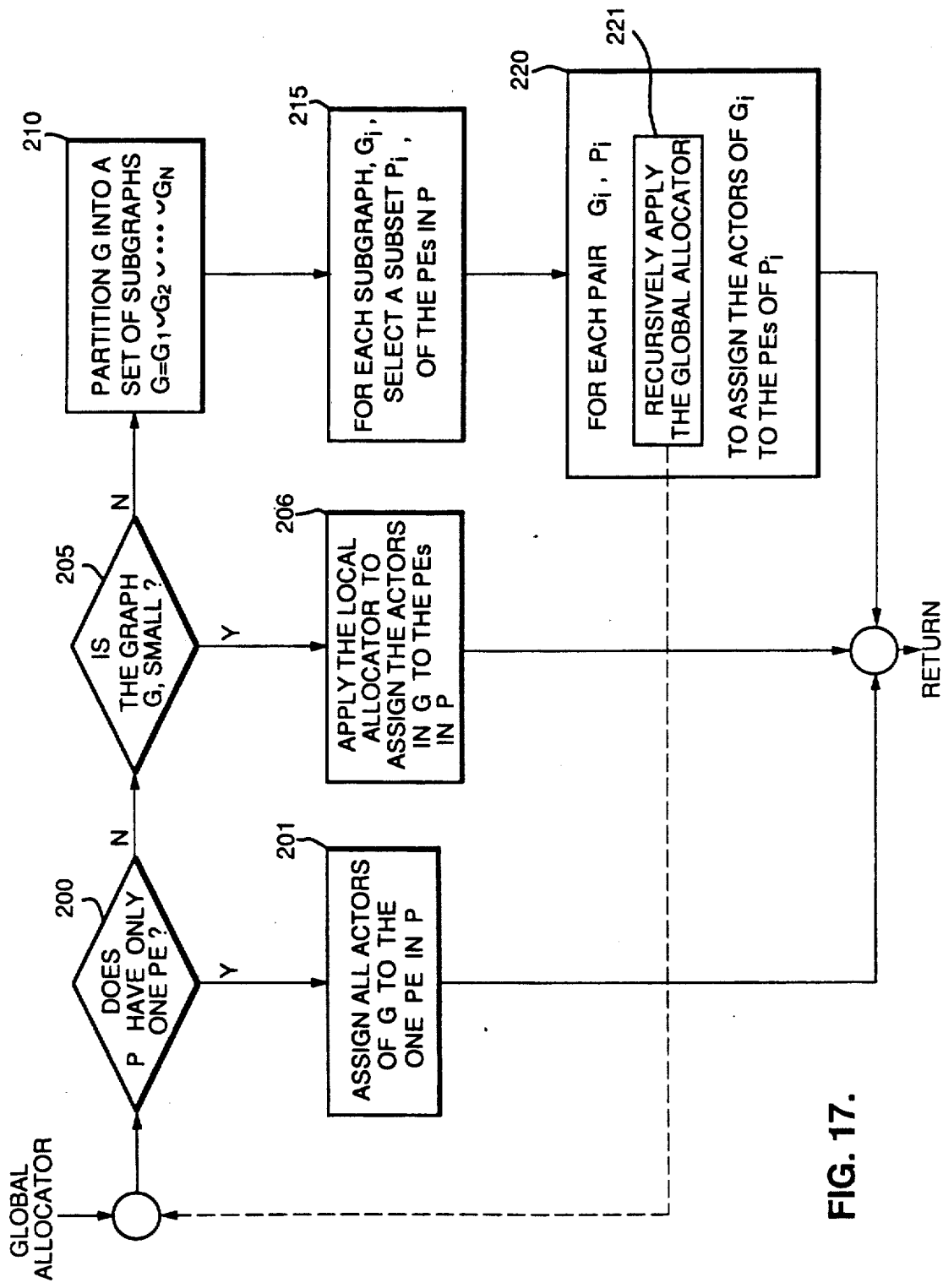
FIG. 17 is a recursive flow chart that describes the global allocation algorithm.

The divide-and-conquer strategy, depicted in the recursive flow chart of FIG. 17, reduces the problem to two related subproblems: partitioning the input graph into a set of smaller, more tractable modules 210, and heuristically assigning each module to a set of processing elements 215. The algorithm proceeds from the top down by partitioning the graph into several modules and assigning each module to some set of the processing elements of the data flow processor. Then, recursively, at 221, it further partitions each module into submodules and assigns each of them to a subset of PEs within the set of PEs to which that module was previously assigned. This partition-and-assign process is repeated hierarchically until the individual submodules are small enough to be allocated efficiently, one actor at a time, to individual PEs 200, 201, 205 and 206.

Figure 18:
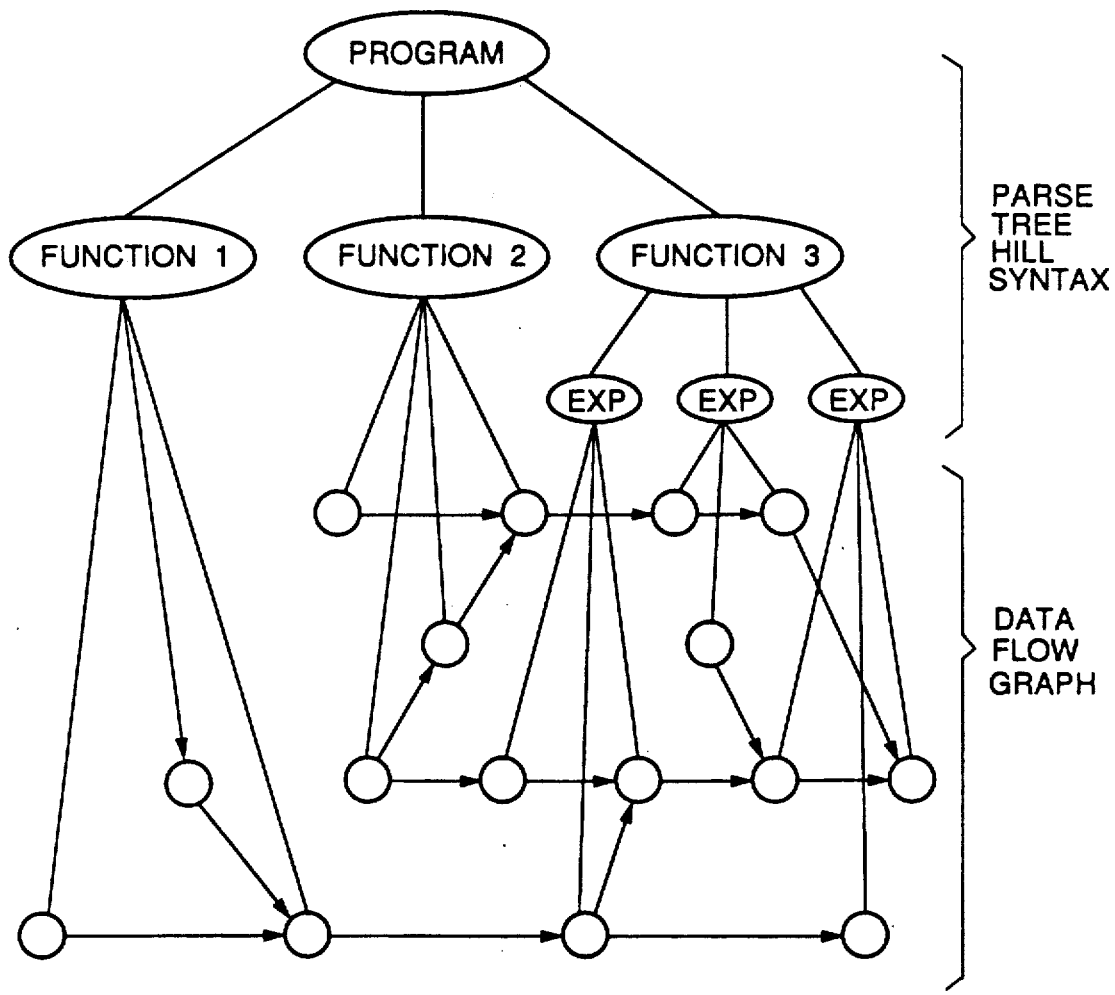
FIG. 18 is a schematic picture of the output of the high-level language compiler which is the input to the global allocator, showing that the syntactic parse tree from the compiler is linked to the instructions produced by the compiler in the form of a data flow graph.

The nodes of the parse tree from the compiler correspond to the syntactic elements of the program such as functions, subfunctions, loop-bodies, and so forth. The tree is connected by pointers to the data flow graph so that the actors of the graph become the leaves of the tree as depicted in FIG. 18. There is a natural correspondence between nodes of the parse tree and modules in the data flow graph. The set of actors below a given node of the tree form the module of the data flow graph that computes the value of the expression corresponding to that node. For example, the root of the tree corresponds to the module consisting of the entire data flow graph program. The children of a node of the tree correspond to the subfunctions and subexpressions of the parent node.

The task 210 of partitioning the data flow graph into a set of modules is guided by this syntactic parse tree. The global allocator partitions a module corresponding to an expression into a set of submodules corresponding to the subexpressions of the expression. In terms of the syntactic parse tree, it splits up a node into the children of the node. In a functional data flow language, expressions and functions can generally be computed in parallel because there are no side effects. Therefore these syntactic elements are usually ideal choices in the partitioning of the corresponding data flow graph.

Figure 21:
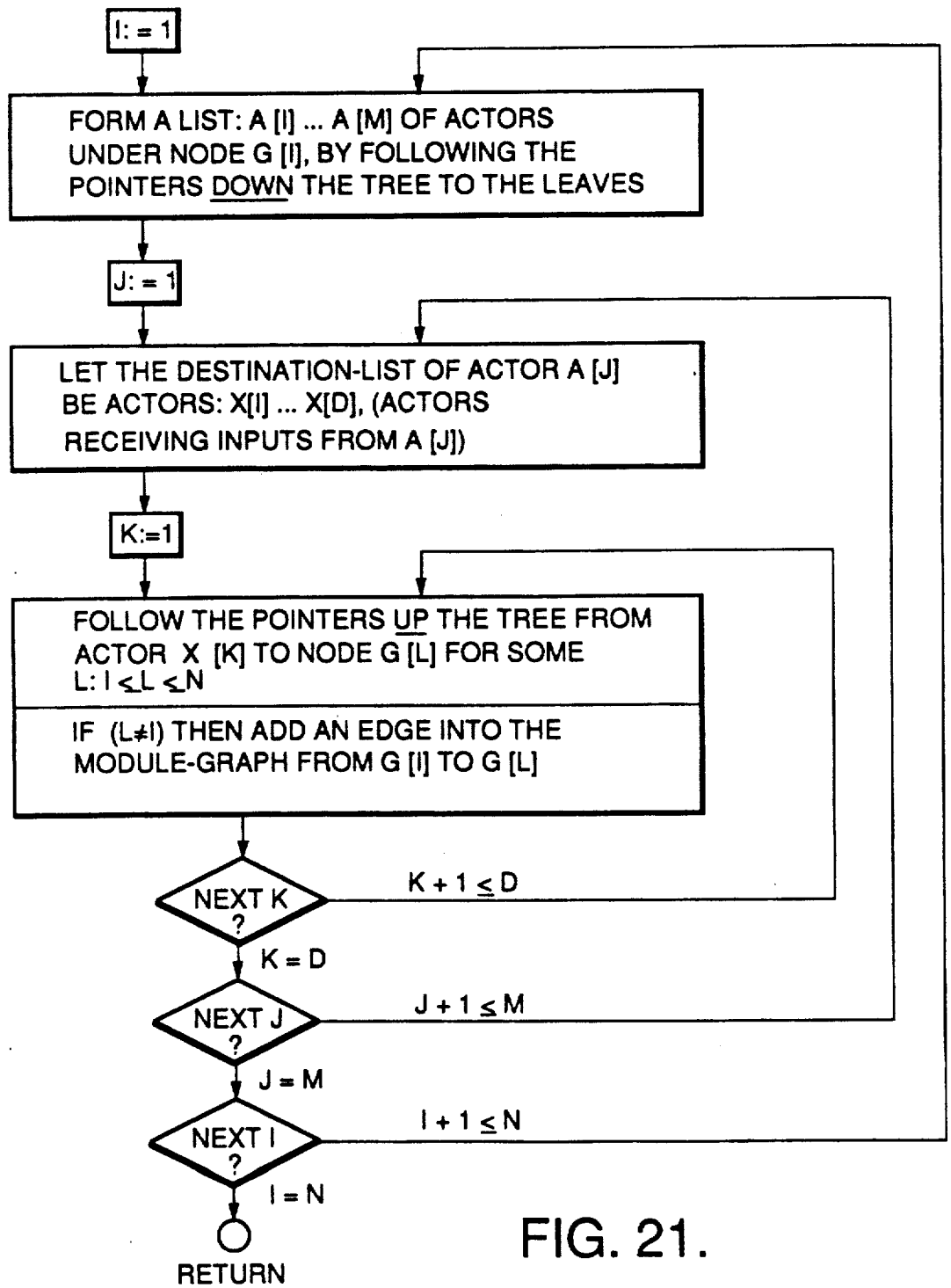
FIG. 21 is a flowchart of the portion of a Global Allocator that finds data dependencies between program modules (as identified by a compiler generated parse ;tree); and wherein dependencies between modules are represented in a module graph as a set of edges between the modules with dependencies.

However, these modules are usually not completely parallel; there can be some data dependencies between them. For example, if there is an expression in the data flow language program that is assigned to a value name, then there will be a data dependency from the module computing that expression to any other modules that refer to that value name. The global allocator finds such data dependencies between modules by looking for data dependency arcs between individual actors in different modules. These dependencies are then used to construct a graph called the "module graph," the nodes of which correspond to modules of the partitioned data flow graph, and the arcs of which indicate the data dependencies between submodules (see FIG. 21). It is essentially another data flow graph.

Figure 22:
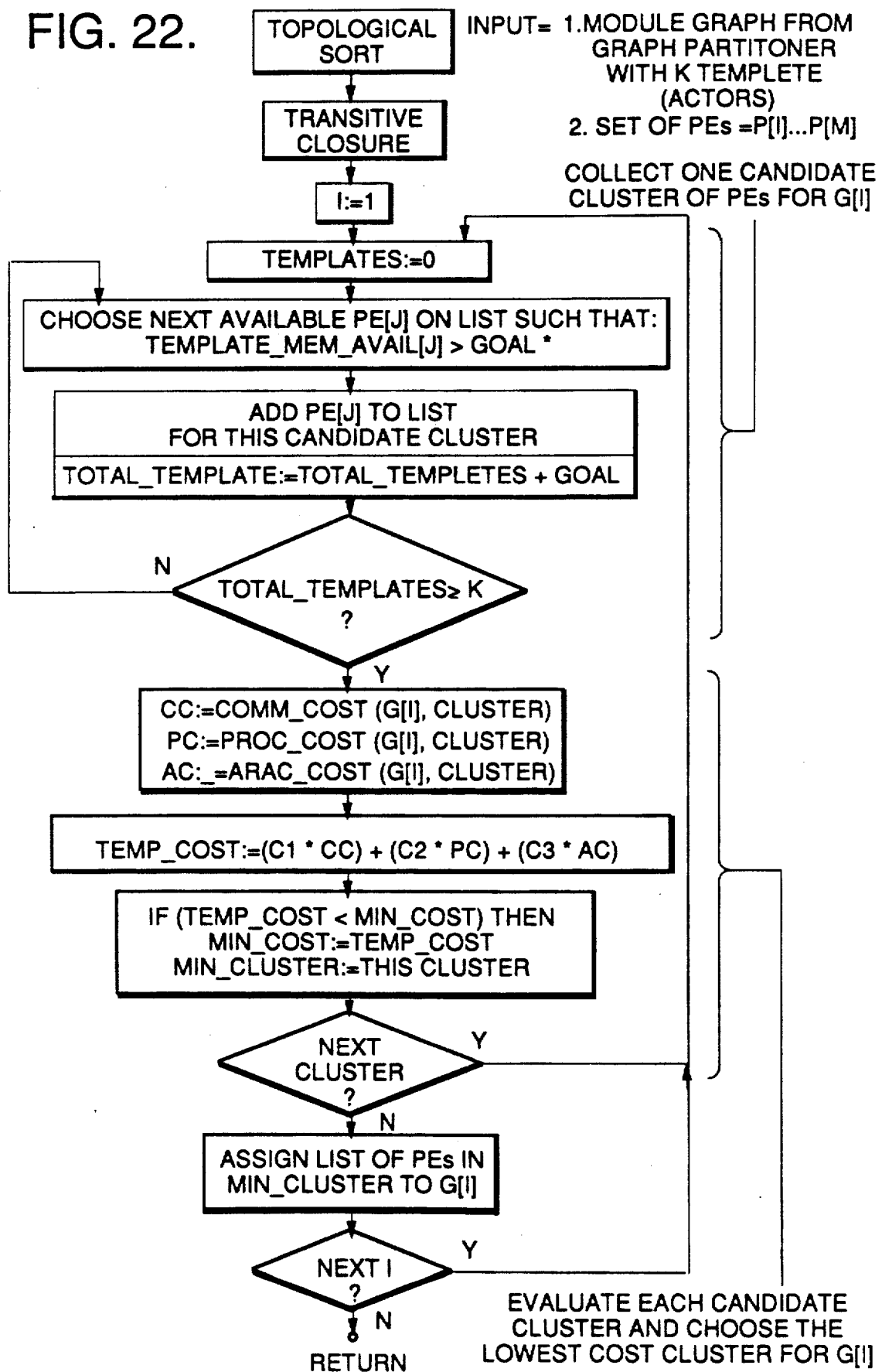
FIG. 22 is a flowchart of the portion of the Global Allocator that uses the module graph of FIG. 21 and a set of cost heuristics like those of the Local Allocator of FIG. 19 to allocate modules to clusters of PEs in the same manner as the Local Allocator allocates actors to individual PEs.

The task 215 of assigning the nodes (submodules) of the module graph to sets of PEs is similar to the assignment performed by the local allocator program. A variant of that algorithm is used (see FIG. 22). First the nodes of the module graph are topologically sorted, then its transitive closure is computed. In this way it is never required to compute the transitive closure of the entire graph at one time, so the inefficiency of the local allocator on large graphs is avoided.

In the current implementation of the global allocator, the task 215 of selecting a subset of PEs for a subgraph is performed using a simple search technique. The set of PEs is stored as a circular list sorted so that PEs, that are close to each other with respect to the distance function (referred to above), are close to each other in the list. Choosing a starting point in the list of PEs, the global allocator searches linearly through the list to collect PEs with available template (actor) memory until it has selected enough PEs to hold all the actors in the subgraph This subset of PEs forms one candidate subset for the subgraph Several such subsets are selected using different starting points in the list, and the best candidate is chosen using heuristic cost functions as in the local allocator.

In the global allocator the assignment 215 of modules to PEs is guided by two of the heuristic cost functions defined previously in the section dealing with the local allocator. They have been generalized to apply to modules consisting of many individual actors being assigned to sets of PEs. For the communication cost function the distance function between PEs is generalized to an average distance between sets of PEs by using the distances between the individual PEs divided by the number of the PEs. For the generalized parallel processing cost function a higher cost is assigned whenever parallel modules (according to the transitive closure of the module graph) are assigned to intersecting sets of PEs, weighted by the number of PEs in the intersection. As before, the exact values returned are somewhat arbitrary.

SIMULATION RESULTS

The two programs which have been simulated most extensively are related to realtime radar signal processing applications. Both programs have been simulated using a variety of allocation algorithms and processing element configurations.

The radar3na program has 96 actors, 152 arcs, 17 constants, an average ALU execution time of 7.19 cycles (50 ns cycle time), an average actor fanout (the number of output arcs for an actor) of 1.58 arcs, and a degree of parallelism of 21.14 actor firings per cycle (the average number of actors which can fire in parallel on the instruction-level simulator).

The radarb program uses a 16-point fast Fourier transform (FFT) with complex arithmetic. It has 415 actors, 615 arcs, 71 constants, an average ALU execution time of 4.92 cycles, an average actor fanout of 1.56 arcs, and a degree of parallelism of 80.63 actor firings per cycle.

Both programs were simulated on $1\times1\times1$, $2\times1\times1$, $2\times2\times1$, $2\times3\times1$, $2\times2\times2$, $2\times2\times3$, $3\times3\times2$. $3\times3\times3$. $4\times3\times3$. $4\times4\times3$, and $4\times4\times4$ configurations of processing elements. Radarb was also simulated on an $\times4\times4$ configuration. Both of these programs were designed to be continuously processing incoming data. In the simulations eight sets of data were used for each program execution. Each input actor grabbed successive data as soon as it could fire, thus the programs were processing several sets of input data simultaneously. No explicit pipeline stages existed, nor were any acknowledgement tokens used to prevent sets of input data from interfering with each other. Instead, operand queues were used to guarantee safety. All three allocation algorithms were used for radar3na, but only the nontransitive closure and random algorithms were used for radarb because the transitive closure algorithm would have consumed too much CPU time. In all, more than 300 simulations were carried out using these two programs.

Figure 9:
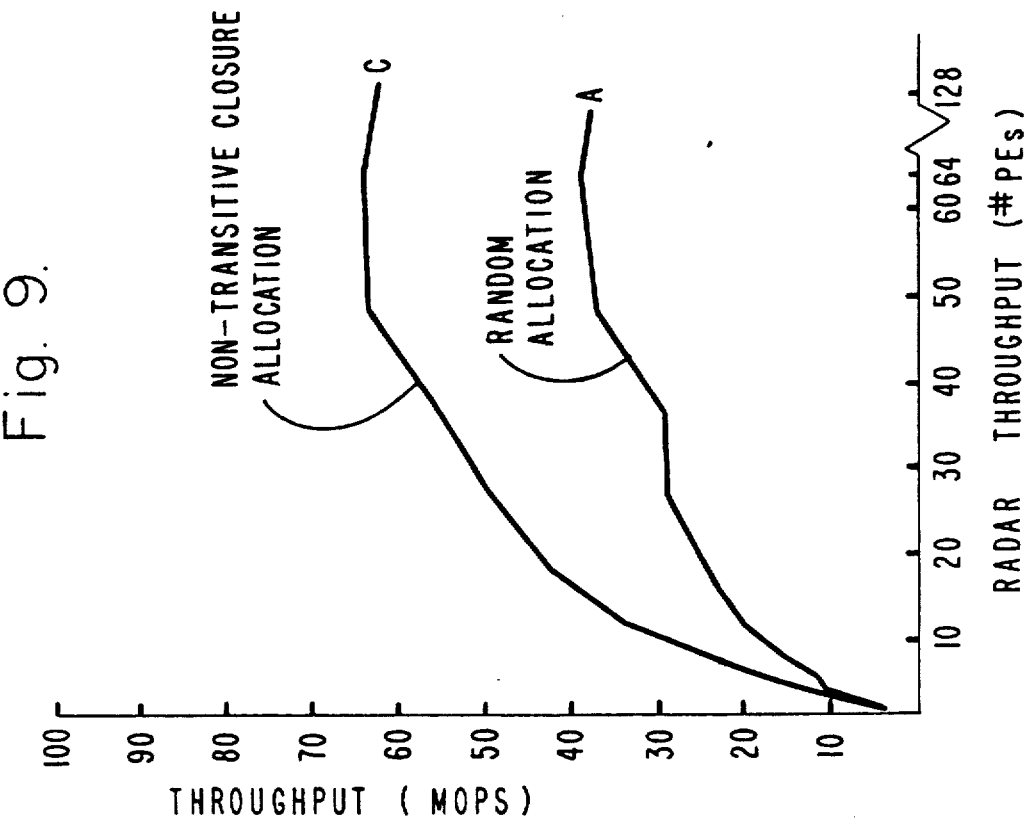
FIG. 9 is a plot of simulation results for the program radarb. The ordinate represents thoughput in MIPS and the abscissa represents number of processing elements. The lower curve is for a random allocation algorithm and the upper curve is for nontransitive closure allocation algorithm.
Figure 8:
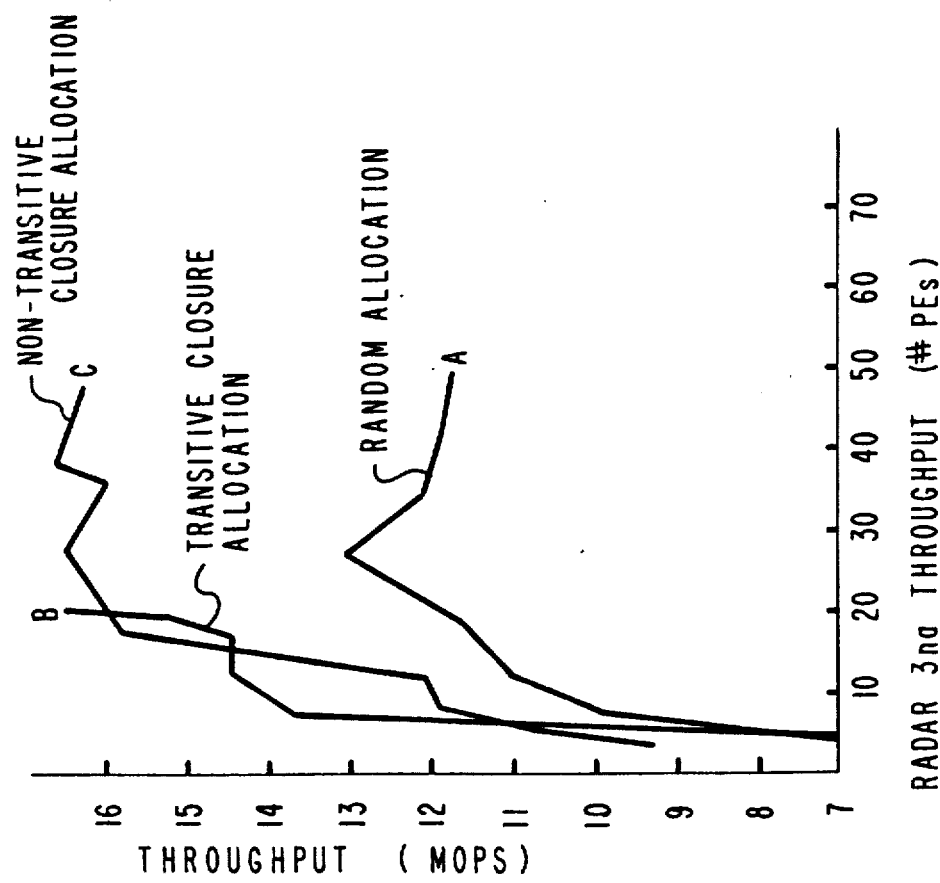
FIG. 8 is a simulation results graph of throughput for the program radar3na (in millions of instructions per second) versus the number of processing elements. The curve marked "A" is for random allocation algorithm, the curve marked "B" for an allocation algorithm using transitive closure, and the curve marked "C" for an allocation algorithm using nontransitive closure.

FIGS. 8 and 9 illustrate that both radar3na and radarb have significantly better throughput using the nonrandom allocations. The transitive closure algorithm yields about the same maximum throughput as the nontransitive closure algorithm, but uses fewer PEs, because it is more likely than the nontransitive closure algorithm to place two actors into the same PE when they fire sequentially. In comparing the results shown in FIG. 9 with the data flow simulation results of Gostelow and Thomas (in FIGS. 9D and 9E of their paper "Performance of a Simulated Data Flow Computer," published in the Proceedings of the Institute of Electrical and Electronics Engineers TOC, Volume C-29, Number 10, Oct. 1980, pages 905-919), it can be seen that the present invention has a much greater improvement in performance as additional processing elements are used.

Figure 11:
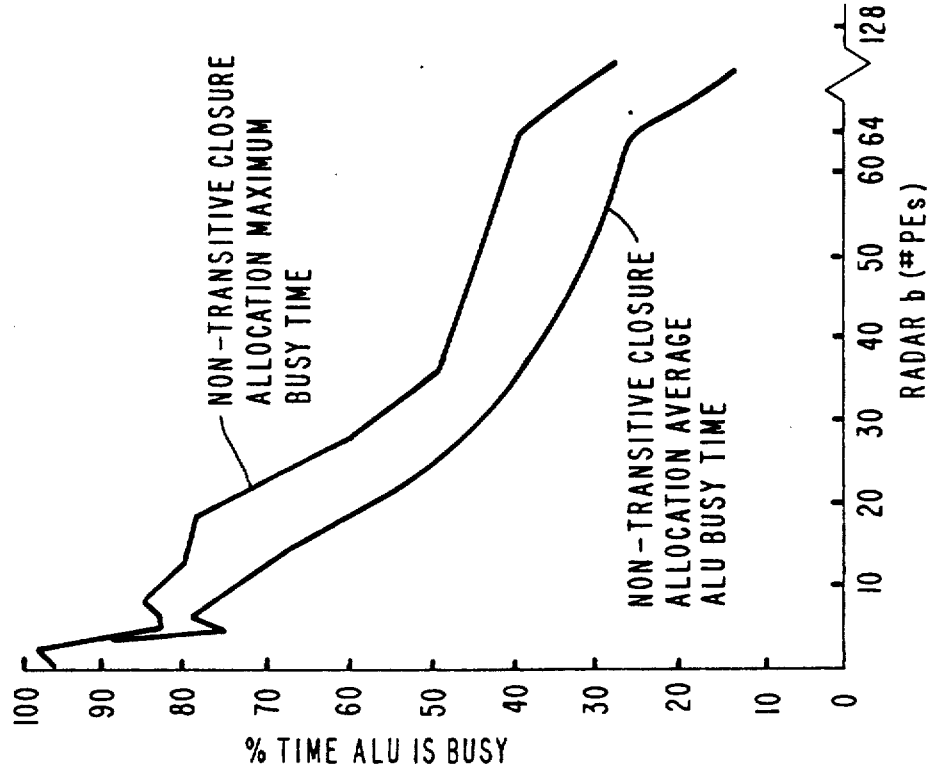
FIG. 11 shows percentage of time the ALU is busy in simulation of the program radarb versus number of processing elements, using a nontransitive closure allocation algorithm. The lower curve is for average ALU busy time and the upper curve is for maximum ALU busy time.
Figure 10:
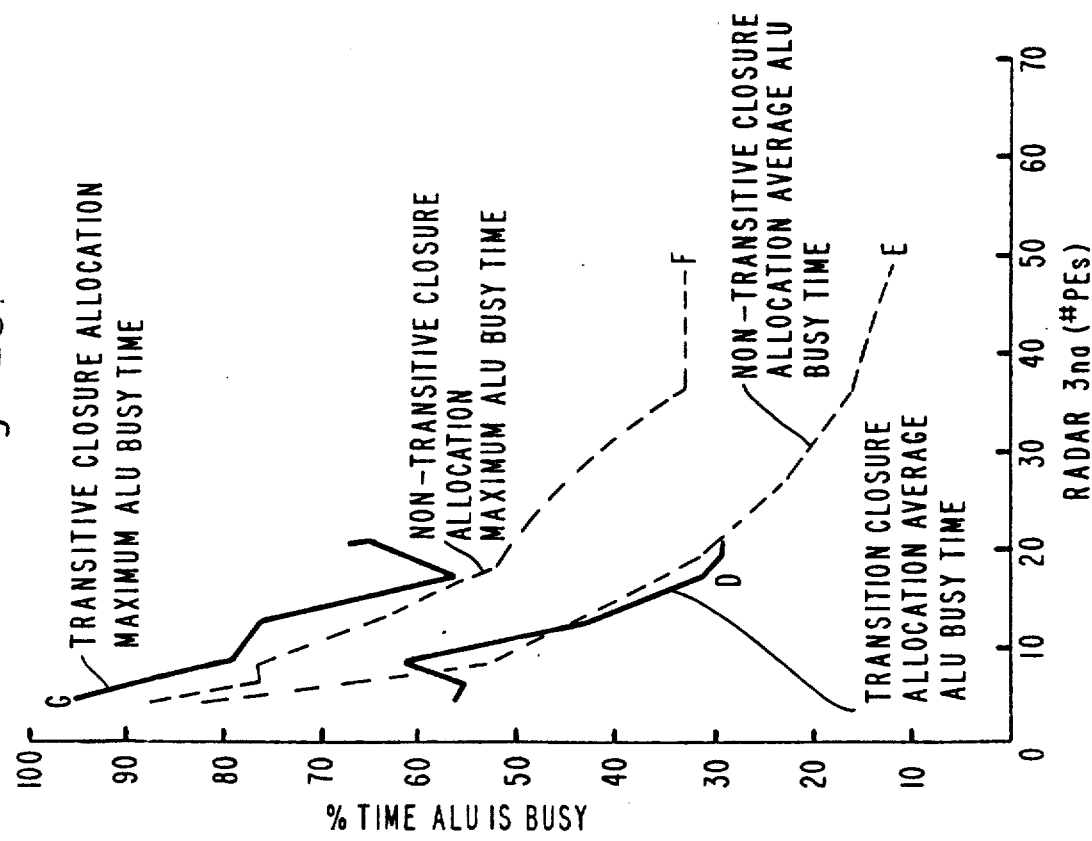
FIG. 10 is a simulation results graph of percentage of time the ALU is busy versus the number of processing elements for the program radar3na. The solid curves marked "D" and "G" are average ALU busy time and maximum ALU busy time, respectively, for a transitive closure allocation algorithm. The curves marked "E" and "F" are average ALU busy time and maximum ALU busy time, respectively, for a nontransitive closure allocation algorithm.

FIGS. 10 and 11 show how the percentage of time the ALU is busy executing actors varies with respect to the number of processing elements The more PEs that are used the less time the average ALU is busy. This is due primarily to each PE having fewer actors that are ready to fire at any given time. It is not due to an increase in packet (token) latency (see FIG. 16) Note that the difference between the average ALU busy time and the maximum ALU busy time is small, which implies that the workload is fairly evenly distributed. In addition, FIG. 10 shows that the transitive closure and nontransitive closure graphs have similar performance. The portion of the nontransitive closure graph beyond 20 PEs is not of interest because the throughput does not increase when more than 20 PEs are used.

Figure 12:
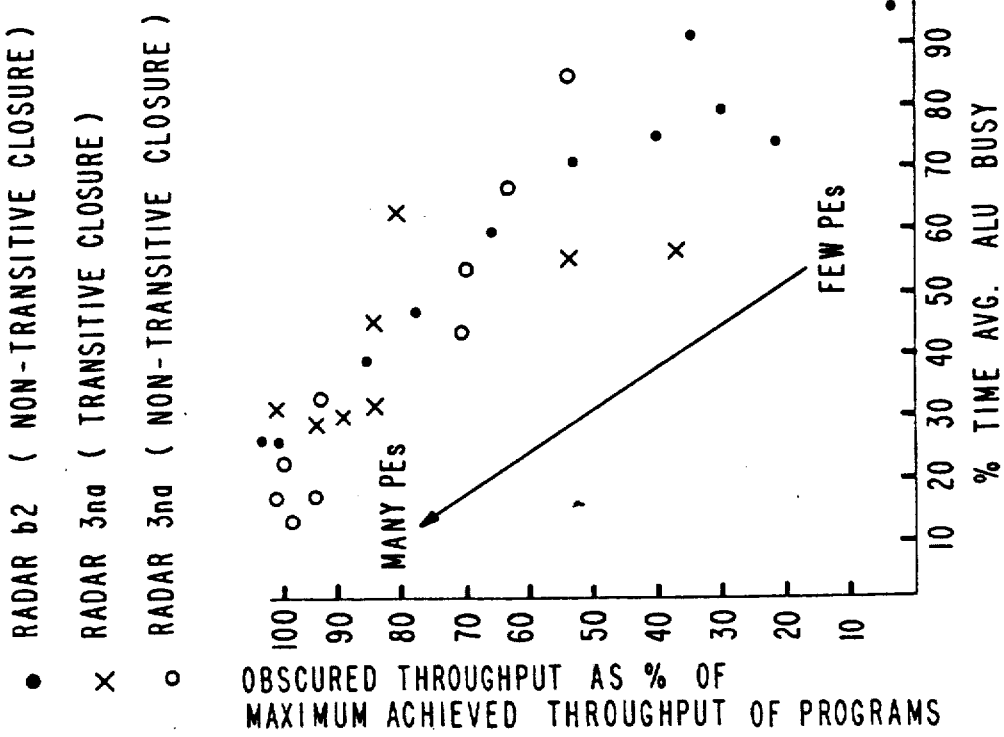
FIG. 12 is a graph of percentage of maximum achieved throughput versus percentage of time the average ALU is busy. The solid circles are from simulation results for the program radarb using a nontransitive closure allocation algorithm. The x-symbols and open circles are for the program radar3na using transitive closure and nontransitive closure allocation algorithms, respectively.

FIG. 12 shows how FIGS. 8 through 11 imply that there is a tradeoff between maximizing throughout and efficiently using PEs. For configurations with very few PEs, the average ALU is very busy, but the program throughput is significantly less than the maximum that may be obtained because not all of the parallelism of the program is being exploited. As more PEs are used, the program throughput increases but the percentage of time that the average ALU is busy decreases.

This is not to say that allocations of programs may not be found that achieve high throughput and keep the average ALU very busy. The relationship between maximizing throughput and efficiently using PEs depends on the parallelism in the graph, the allocation, and the hardware. For example, an allocation may have only five actors that can fire in parallel on the average, but ten actors that can fire in parallel at a particular time. In this case the achievement of maximum throughput could require using ten PEs, even though only five are needed on the average.

Figure 13:
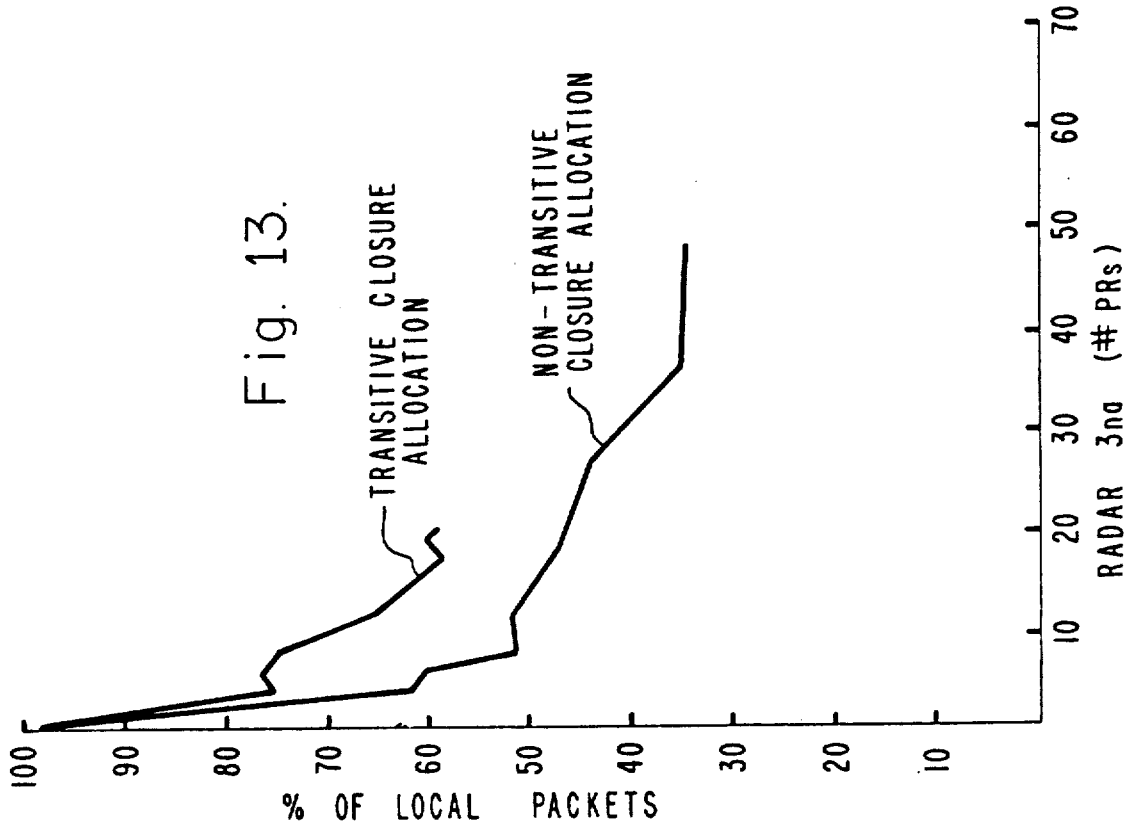
FIG. 13 is a plot of the percentage of packet communication that is local (intra-PE as opposed to inter-PE) versus number of processing elements for the program radar3na. The lower curve is for a transitive closure allocation algorithm and the upper curve is for a nontransitive closure allocation algorithm.
Figure 14:
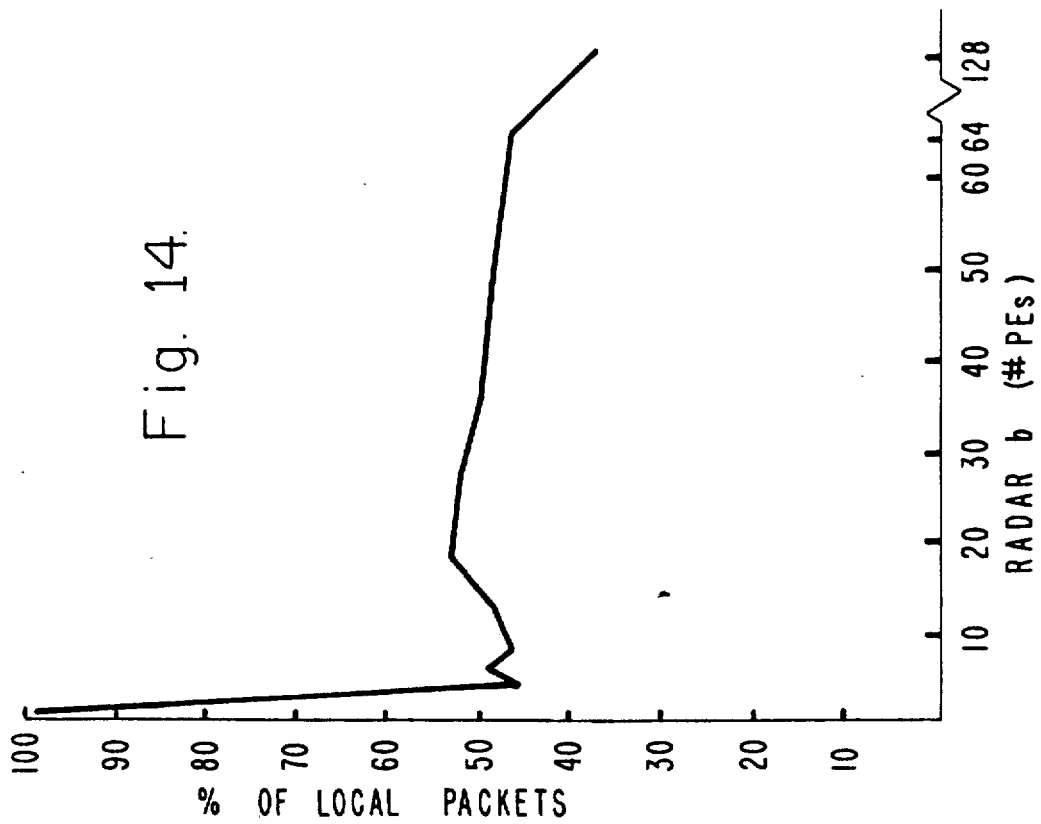
FIG. 14 is a plot of the percentage of packet communication that is local (intra-PE as opposed to inter-PE) versus number of processing elements for the program radarb suing a nontransitive closure allocation algorithm.

FIGS. 13 and 14 shows how the percentage of packet communication that is local (within a PE rather than between PEs) varies with the number of PEs for ra- dar3na and radarb. They show that as the number of PEs increases, less of the packet communication traffic is local. As one might expect, the transitive closure allocation algorithm has more local packet communication than the nontransitive closure algorithm. What is surprising is that for radarb, which has more than four times as many actors as radar3na, the percentage of local packet communication does not decrease very rapidly, and in fact sometimes increases, as more PEs are used.

Figure 15:
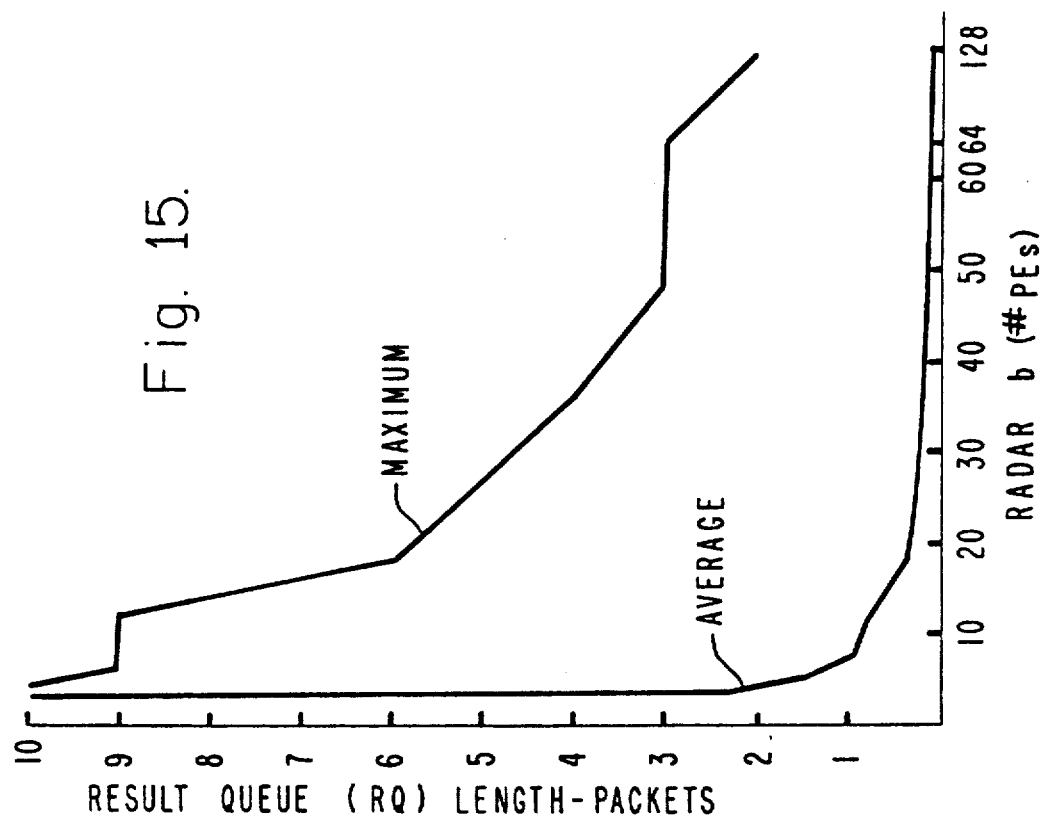
FIG. 15 is a graph of the length (in packets) of the result queue versus number of processing elements for the nontransitive closure allocation of the program radarb. The lower curve is average queue length and the upper curve is maximum queue length.

FIG. 15 illustrates the average and maximum length of the result queue for the nontransitive closure allocation of radarb. Not shown in FIG. 15 because of the scale chosen are results of 103 and 158 for the average and maximum queue lengths for one PE, and 42 and 74 for the average and maximum queue lengths for two PEs. Note that the average queue length decreases rapidly beyond a few PEs, and that for eight or more PEs the average queue length is less than one packet. This is characteristic of the other queues in the communications and processor chips, and indicates that the queue lengths may be limited to a few words so long as a queue overflow area is provided or other methods are used to prevent deadlock.

One of the first things that was learned through simulation was that deadlock was much more likely to occur in our original architecture. Radar3na and radarb both suffered intra-PE deadlock (firing queue, result queue, and feedback queues filled up) when allocated to one PE, and radarb suffered inter-PE deadlock (communication chip queues, firing queue, and result queues filled up) when allocated to four PEs. Our original architecture had limited all queues in the communication and processing chip to a length of eight words. In order to alleviate both intra-PE and inter-PE deadlock we added a result queue overflow area to the destination memory that could be used when the portion of the result queue on the processing chip was full. This explains the large average and maximum result queue lengths for configurations with few PEs.

FIG. 16 shows how the average communication packet latency varies with number of PEs. This measure of latency includes the packet delays encountered in the communication chips and in accessing the communication chips. It does not take into account the delays encountered in the template memory controller, firing queue, ALU, result queue, or destination tagger. It measures the latency from the output of the DT to the input of the template memory controller. It is a good measure of the efficiency of the communication system. Note that for few PEs there is very little communication chip activity, hence the packet latency contributed by the communication chip is low. As shown in FIG. 16 the average communication packet latency peaks at four PEs and decreases rapidly for more PEs. For 18 or more PEs the average packet latency is almost constant, implying that the decrease in the rate of increase of the throughput of radarb as more PEs are used (see FIG. 9) is due primarily to a limited amount of parallelism in the graph rather than increased communication latency.

Although the present invention has been described in detail with reference to a particular preferred embodiment, persons possessing ordinary skill in the art to which this invention pertains will appreciate that various modifications may be made without departing from the spirit and scope of the invention.

What is claimed is:

1. A method of data-flow multiprocessing for highly efficient data and signal processing, including the steps of:
    writing a program of instructions in a high-level language onto a storage medium;
    reading said program of instructions from said storage medium into a compiler;
    compiling by said compiler said instructions by translating said instructions into a plurality of machine instructions;
    inputting a file describing a data-flow processor having multiple processing elements, with an identification scheme for said processing elements being formed in accordance with a three-dimensional array of processing elements, into a global allocator program;
    running said global allocator program in order to process said plurality of machine instructions in order to assign said machine instructions to a plurality of said processing elements in said data-flow processor for execution of said machine instructions;
    inputting a plurality of data into said data-flow processor in order to execute said program in said data-flow processor; and
    executing said machine instructions in said data-flow processor; and
    wherein said executing step includes a step of employing a template memory in each of said processing elements for identifying data elements from a plurality of said processing elements for arithmetic operations.

2. A method of data-flow multiprocessing for highly efficient data and signal processing, including the steps of:

writing a program of instructions in a graph assembly language onto a storage medium;

reading said program of instructions from said storage medium into an assembler;

inputting a file describing a data-flow processor into an assembler;

assembling by said assembler said instructions by translating said instructions into a plurality of machine instructions;

inputting said machine instructions into a local allocator program for allocation of machine instructions to a data-flow processor having multiple processing elements with an identification scheme for said processing elements being formed in accordance with a three-dimensional array of processing elements in said data flow processor;

running said local allocator program in order to process said plurality of machine instructions in order to assign said machine instructions to a plurality of said processing elements in said data-flow processor for execution of said machine instructions;

inputting a plurality of data into said data-flow processor in order to execute said program in said data-flow processor;

executing said machine instructions in said data-flow processor; and wherein said executing step includes a step of employing a template memory in each of said processing elements for identifying data elements from a plurality of said processing elements for arithmetic operations.

3. Data-flow apparatus for highly efficient data and signal processing, comprising:

a compilation means for translating instructions written in a high-level data-flow language into a plurality of machine instructions;

a first input ;means for communicating programs written in said high-level data-flow language to said compilation means;

a data-flow processing means for operating on a plurality of machine instructions;

a global allocation means for accepting a plurality of outputs from said compilation means and for accepting a file of instructions describing said data-flow processing means, said global allocation means allocating said machine, instructions from said compilation means among a plurality of data flow processing elements of said data-flow processing means;

said data-flow processing means further including:

said plurality of data-flow processing elements with an identification scheme for said processing elements being formed in accordance with a three-dimensional array, each of said processing elements including:

a communication part, a processor part, a plurality of first memories, and a template memory for identifying data elements from a plurality of said processing elements for arithmetic operations wherein said communication part, said processor part, and said memories are connected to a bus means;

a bussed packet routing network including a plurality of communications buses connecting said processing elements;

a second input means coupled to said data-flow processing means in order to communicate a plurality of data to said data-flow processing means; and a plurality of output means coupled to said data-flow processing means in order to communicate a plurality of results from said data-flow processing means to an output terminal means.

4. Data-flow apparatus for highly efficient data and signal processing, comprising:

an assembling means for translating instructions written in a data-flow graph language into a plurality of machine instructions;

a first input means for communicating programs written in said high-level data-flow graph language and for communicating a file of instructions describing a data-flow processing means to said assembling means;

a data-flow processing means for operating on a plurality of machine instructions;

said data-flow processing means further including:

a plurality of data-flow processing elements with an identification scheme said for processing elements being formed in accordance with a three-dimensional array, each of said processing elements including a communications part, a processor part, a plurality of first memories, and a template memory for identifying data elements from a plurality of said processing elements for arithmetic operations wherein said communication part, said processor part, and said memories are connected to a bus means;

a bussed packet routing network including a plurality of communications buses connecting said processing elements;

a local allocation means for accepting a plurality of outputs from said assembling means, said local allocation means allocating said machine instructions from said assembling means among the processing elements of said data-flow processing means;

a second input means coupled to said data-flow processing means in order to communicate a plurality of data to said data-flow processing means; and a plurality of output means coupled to said data-flow processing means in order to communicate a plurality of results from said data-flow processing means to an output terminal means.

5. Data-flow apparatus for highly efficient data and signal processing, comprising:

a compilation means for translating instructions written in a high-level data-flow language into a plurality of machine instructions;

a first input means for communicating program written in said high-level data-flow language to said compilation means;

a data-flow processing means for operating on a plurality of machine instructions, said data-flow processing ;means including a plurality of data-flow processing elements, and a three-dimensional bussed packet routing network including a plurality of communications buses connecting said processing elements;

a global allocation means for accepting a plurality of outputs from said compilation means and for accepting a file of instructions describing said data-flow processing means, said global allocation means allocating said machine instructions from said composition means among the processing elements of said data-flow processing means;

a second input means coupled to said data-flow processing means in order to communicate a plurality of data to said data-flow processing means; and a plurality of output means coupled to said data-flow processing means in order to communicate a plurality of results from said data-flow processing means to an output terminal means; and wherein said processing element further comprises:

a plurality of communication means for transmission and reception of digital signals;

a first communication part connected to said plurality of communication means, which includes a plurality of first queues, a plurality of connections between said first queues, and a first memory connected to one of said first queues;

a processor part which includes a plurality of micromachines, a plurality of second queues, a plurality of second memories, and a plurality of connections between said micromachines, said second memories, and said second queues;

a plurality of third memories connected to receive addresses from said processor part and to supply to or receive data from said processor part; and a bus connecting said communication part to said processor part.

6. Data-flow apparatus for highly efficient data and signal processing as described in claim 5 in which said three-dimensional bussed packet routing network further includes a bidirectional plane bus, a bidirectional column bus, and a bidirectional row bus, and in which each said processing element is connected to said bidirectional plane, column, and row buses.

7. Data-flow apparatus for highly efficient data and signal processing as described in claim 6 in which each said communication part of each said processing element further includes:

a bidirectional processor bus;

a first-in-first-out plane input buffer queue, connected to said plane bus;

a first-in-first-out plane output buffer queue, connected to said plane bus;

a first-in-first-out column input buffer queue, connected to said column bus;

a first-in-first-out column output buffer queue, connected to said column bus;

a first-in-first-out row input buffer queue, connected to said row bus;

a first-in-first-out row output buffer queue, connected to said row bus;

a first-in-first-out processor input buffer queue, connected to said processor bus;

a first-in-first-out processor output buffer queue, connected to said processor bus;

a first internal bus connected to said processor input, plane input, column input, and row input buffer queues for sending packets from said processor, plane, column, and row input buffer queues to said processor, plane, column, and row output queues a second internal bus connected to said processor output, plane output, column output, and row output buffer queue for sending packets from said processor, plane, column, and row input buffer queues to said processor, plane, column, and row output buffer queues;

an error memory; and a bidirectional error memory bus connecting said error memory to said processor input buffer queue; and each said processor part of each said processing element further includes:

a template memory controller micromachine;

a fire detect memory, forming part of said template memory controller micromachine;

an arithmetic and logic unit (ALU) micromachine;

a microprocessor, forming part of said ALU micromachine;

a micromemory, forming part of said ALU micromachine which controls said ALU micromachine;

a destination tagger micromachine;

a destination memory controller micromachine;

a template memory, connected to said template memory controller micromachine so as to receive addresses from said template memory controller micromachine and to receive data from or supply data to said template memory controller micromachine;

a first-in-first-out firing queue, connected from said template memory controller micromachine to said ALU micromachine;

a first-in-first-out result queue connected from said ALU micromachine to said destination tagger micromachine;

a bidirectional controller bus linking said destination memory controller micromachine to said template memory controller micromachine;

a first-in-first-out feedback queue connected from said destination tagger micromachine to said bidirectional controller bus;

a first-in-first-out "to communication" queue connected from said destination tagger micromachine to said bidirectional processor bus;

a first-in-first-out "from communication" queue connected from said bidirectional processor bus to said bidirectional controller bus;

a first-in-first-out associated information queue;

a first-in-first-out destination queue;

a destination memory, connected to said destination memory controller micromachine so as to receive addresses from said destination memory controller micromachine; and a bidirectional destination memory data bus connected to said destination memory and linking said destination memory with said destination queue, said associated information queue, and said ALU micromachine, to communicate data between said destination memory and said destination queue, said associated information queue, and said ALU micromachine.

8. Data-flow apparatus for highly efficient data and signal processing as described in claim 7 in which said processor part of said processing element and said communication part of said processing element are both implemented in very large scale integration (VLSI) circuitry.

9. Data-flow apparatus for highly efficient data and signal processing, comprising:

an assembly means for translating instructions written in a data-flow graph language into a plurality of machine instructions;

a first input means for communicating programs written in said data-flow graph language and for communicating a file of instructions describing a data-flow processing means to said assembling means;

a data-flow processing means for operating on a plurality of machine instructions, said data-flow processing means including a plurality of data-flow processing elements, and a three-dimensional bussed packet routing network including a plurality of communications buses connecting said processing elements;

a local allocation means for accepting a plurality of outputs from said assembling means; said local allocation means allocating said machine instructions from said assembling means among the processing elements of said data-flow processing means;

a second input means coupled to said data-flow processing means in order to communicate a plurality of data to said data-flow processing means; and a plurality of output means coupled to said data-flow processing means in order to communicate a plurality of results from said data-flow processing means to an output terminal means; and wherein each said processing element further includes:

a plurality of communication means for transmission and reception of digital signals;

a communication part which includes a plurality of first queue, a plurality of connections between said first queues, and a first memory connected to one of said first queues;

a processor part which includes a plurality of micromachines, a plurality of second queues, a plurality of second memories, and a plurality of connections between said micromachines, said second memories, and said second queues;

a plurality of third memories connected so as to receive addresses form said processor part and to supply to or receive data from said processor part; and a bus connecting said communication part to said processor part.

10. Data-flow apparatus for highly efficient data and signal processing as described in claim 9 in which said three-dimensional bussed packet routing network further includes a bidirectional plane bus, a bidirectional column bus, and a bidirectional row bus, and in which each said processing element is connected to said bidirectional plane, column, and row buses.

11. Data-flow apparatus for highly efficient data and signal processing as described in claim 10 in which each said communication part of each said processing element further includes:

a bidirectional processor bus;

a first-in-first-out plane input buffer queue, connected to said plane bus;

a first-in-first-out plane output buffer queue, connected to said plane bus;

a first-in-first-out column input buffer queue, connected to said column bus;

a first-in-first-out column output buffer queue, connected to said column bus;

a first-in-first-out row input buffer queue, connected to said row bus;

a first-in-first-out row output buffer queue, connected to said row bus;

a first-in-first-out processor input buffer queue, connected to said processor bus;

a first-in-first-out processor output buffer queue, connected to said processor bus;

a first internal bus connected to said processor input, plane input, column input, and row input buffer queues for sending packets from said processor, plane, column, and row input buffer queues to said processor, plane, column, and row output queues;

a second internal bus connected to said processor output, plane output, column output, and row output buffer queue for sending packets from said processor, plane, column, and row input buffer queues to said processor, plane, column, and row output buffer queues;

an error memory; and a bidirectional error memory bus connecting said error memory to said processor input buffer queue; and each said processor part of each said processing element further includes:

a template memory controller micromachine;

a fire detect memory, forming part of said template memory controller micromachine;

an arithmetic and logic unit (ALU) micromachine;

a microprocessor, forming part of said ALU micromachine;

a micromemory, forming part of said ALU micromachine, which controls said ALU micromachine;

a destination tagger micromachine;

a destination memory controller micromachine;

a template memory, connected to said template memory controller micromachine so as to receive addresses from said template memory controller micromachine and to receive data from or supply data to said template memory controller micromachine;

a first-in-first-out firing queue, connected from said template memory controller micromachine to said ALU micromachine;

a first-in-first-out result queue connected from said ALU micromachine to said destination tagger micromachine;

a bidirectional controller bus linking said destination memory controller micromachine to said template memory controller micromachine;

a first-in-first-out feedback queue connected from said destination tagger micromachine to said bidirectional controller bus;

a first-in-first-out "to communication" queue connected from said destination tagger micromachine to said bidirectional processor bus;

a first-in-first-out "from communication" queue connected from said bidirectional processor bus to said bidirectional controller bus;

a first-in-first-out associated information queue;

a first-in-first-out destination queue;

a destination memory, connected to said destination memory controller micromachine so as to receive addresses from said destination memory controller micromachine; and a bidirectional destination memory data bus connected to said destination memory and linking said destination memory with said destination queue, said associated information queue, and said ALU micromachine, to communicate data between said destination memory and said destination queue, said associated information queue, and said ALU micromachine.

12. Data-flow apparatus for highly efficient data and signal processing as described in claim 11 in which said processor part of said processing element and said communication part of said processing element are both implemented in very large scale integration (VLSI) circuitry.

* * * * *

UNITED STATES PATENT AND TRADEMARK OFFICE
CERTIFICATE OF CORRECTION

PATENT NO. : 5,021,947

DATED : June 4, 1991

INVENTOR(S) : MICHAEL J. CAMPBELL, DENNIS J. FINN, GEORGE K. TUCKER, MICHAEL D. VAHEY and REX W. VEDDER It is certified that error appears in the above-identified patent and that said Letters Patent is hereby corrected as shown below:

On the cover page naming the inventors, delete "Michael J. Campbell" and substitute therefor --Michael L. Campbell--.

Column 21, line 43, Claim 3, delete the comma (",") between the words "input" and "means".

Column 21, line 52, Claim 3, delete the comma (",") between the words "machine" and "instructions".

Column 22, line 25, Claim 4, change "said for" to --for said--.

Column 22, line 56, Claim 5, change "program" to --programs--.

Column 22, line 61, Claim 5, delete the semicolon (";") between the words "processing" and "means".

Column 23, line 3, Claim 5, please change "composition to --compilation--.

Column 23, line 15, Claim 5, delete the word "first" before "communication".

Column 24, line 62, Claim 9, change "assembly" to --assembling--.

Column 25, line 34, Claim 9, delete "so as".

UNITED STATES PATENT AND TRADEMARK OFFICE
CERTIFICATE OF CORRECTION

PATENT NO. : 5,021,947

DATED : June 4, 1991

INVENTOR(S) : MICHAEL J. CAMPBELL, DENNIS J. FINN, GEORGE K. TUCKER, MICHAEL D. VAHEY AND REX W. VEDDER

It is certified that error appears in the above-identified patent and that said Letters Patent is hereby corrected as shown below:

Column 25, line 35, Claim 9, change "form" to --from--.

Signed and Sealed this

Second Day of March, 1993

Attest:

STEPHEN G. KUNIN

*Attesting Officer*   Acting Commissioner of Patents and Trademarks